United States Patent
Inbar et al.

(10) Patent No.: US 10,489,711 B1
(45) Date of Patent: Nov. 26, 2019

(54) METHOD AND APPARATUS FOR PREDICTIVE BEHAVIORAL ANALYTICS FOR IT OPERATIONS

(71) Applicant: EMC IP Holding Company LLC, Hopkinton, MA (US)

(72) Inventors: Daniel S. Inbar, Weston, MA (US); Oshry Ben-Harush, Kiryat Gat (IL); Sallie A. Paige, Blackstone, MA (US); Murale Narayanan, Bangalore (IN); Christopher P. Barry, Hudson, NH (US); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 606 days.

(21) Appl. No.: 14/521,086

(22) Filed: Oct. 22, 2014

Related U.S. Application Data

(60) Provisional application No. 61/893,932, filed on Oct. 22, 2013.

(51) Int. Cl.
  *G06N 5/04* (2006.01)
  *H04L 12/26* (2006.01)
  *G06N 7/00* (2006.01)

(52) U.S. Cl.
  CPC .............. *G06N 5/04* (2013.01); *G06N 7/005* (2013.01); *H04L 43/12* (2013.01)

(58) Field of Classification Search
  CPC .... G06F 11/008; G06F 11/3089; G06F 1/206; G06F 17/30; G06F 9/5077; G06F 11/3419; G06F 11/3495; G06F 2201/875; G06F 19/00; G05D 23/1932; H05K 7/20836; H04L 41/5012; H04L 41/0213; H04L 41/024; H04L 41/5009; H04L 29/06; G06Q 10/06
  USPC .......................................................... 706/27
  See application file for complete search history.

(56) References Cited

U.S. PATENT DOCUMENTS

| | | | | |
|---|---|---|---|---|
| 6,704,874 | B1* | 3/2004 | Porras ................. | H04L 12/2602 709/224 |
| 7,003,564 | B2* | 2/2006 | Greuel ................ | H04L 41/0213 709/223 |
| 2005/0039086 | A1* | 2/2005 | Krishnamurthy ..... | H04L 41/142 714/57 |
| 2008/0059474 | A1* | 3/2008 | Lim ..................... | G06F 17/3089 |
| 2008/0263401 | A1* | 10/2008 | Stenzel ............... | G06F 11/3495 714/31 |
| 2009/0327353 | A1* | 12/2009 | Zhuge ................. | G06F 11/3419 |
| 2010/0042565 | A1* | 2/2010 | Akerman ............ | H04L 43/0852 706/20 |
| 2010/0088410 | A1* | 4/2010 | Ridley ................ | H04L 41/0896 709/224 |

(Continued)

*Primary Examiner* — Li B. Zhen
*Assistant Examiner* — Peter D Coughlan
(74) *Attorney, Agent, or Firm* — Ryan, Mason & Lewis, LLP

(57) ABSTRACT

Example embodiments of the present invention relate to a method, an apparatus, and a computer program product for predictive behavioral analytics for information technology (IT) operations. The method includes collecting key performance indicators from a plurality of data sources in a network. The method also includes performing predictive behavioral analytics on the collected data and reporting on results of the predictive behavioral analytics.

25 Claims, 29 Drawing Sheets

(56) References Cited

U.S. PATENT DOCUMENTS

| | | | |
|---|---|---|---|
| 2010/0217454 A1* | 8/2010 | Spiers | G05D 23/1932 700/300 |
| 2010/0262467 A1* | 10/2010 | Barnhill, Jr. | H04L 12/2809 709/223 |
| 2012/0209568 A1* | 8/2012 | Arndt | G06F 11/3089 702/183 |
| 2013/0111386 A1* | 5/2013 | Rhodes | G06F 9/5077 715/771 |
| 2013/0116976 A1* | 5/2013 | Kanemasa | G06F 11/3419 702/186 |
| 2013/0173514 A1* | 7/2013 | Cruickshank, III | G06N 3/08 706/20 |
| 2013/0205020 A1* | 8/2013 | Broda | G06F 11/3495 709/224 |

* cited by examiner

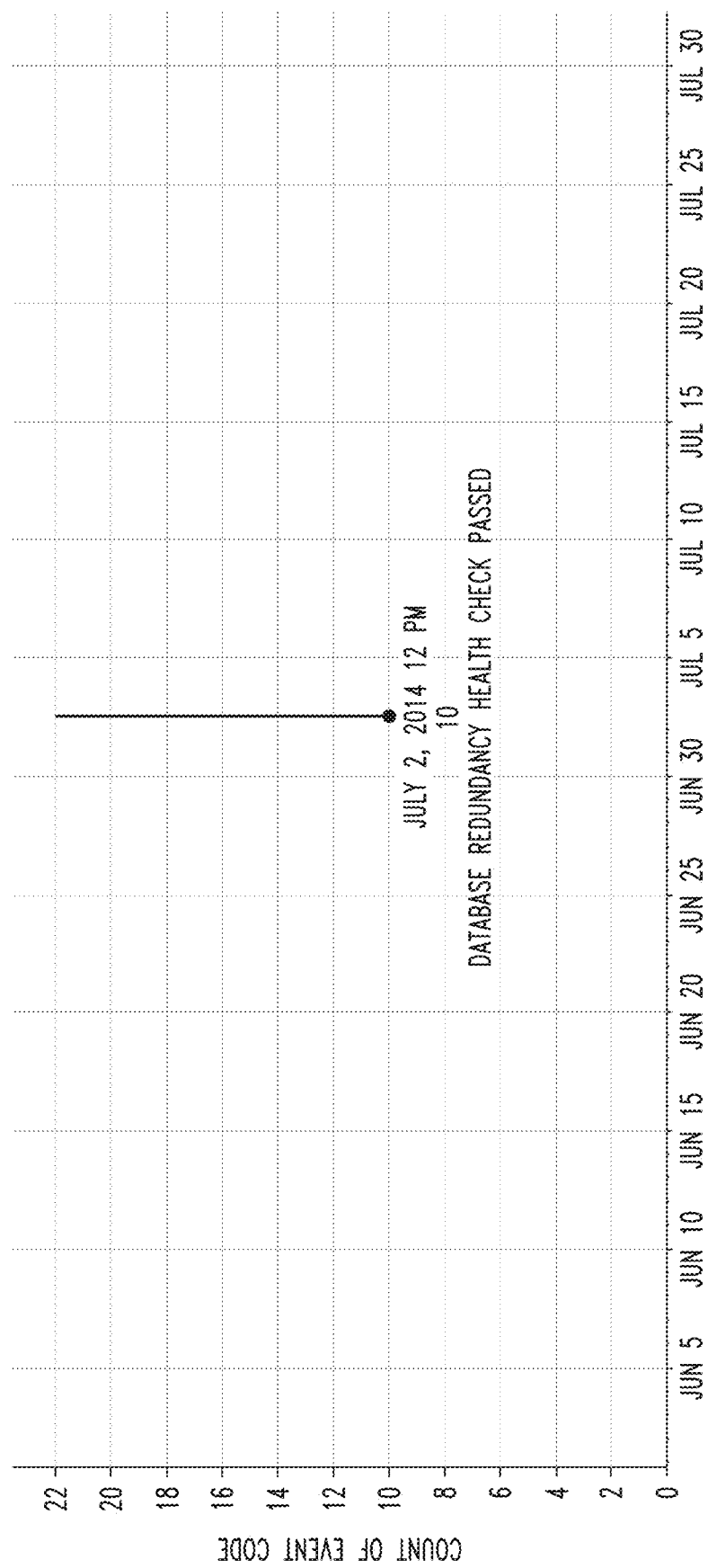

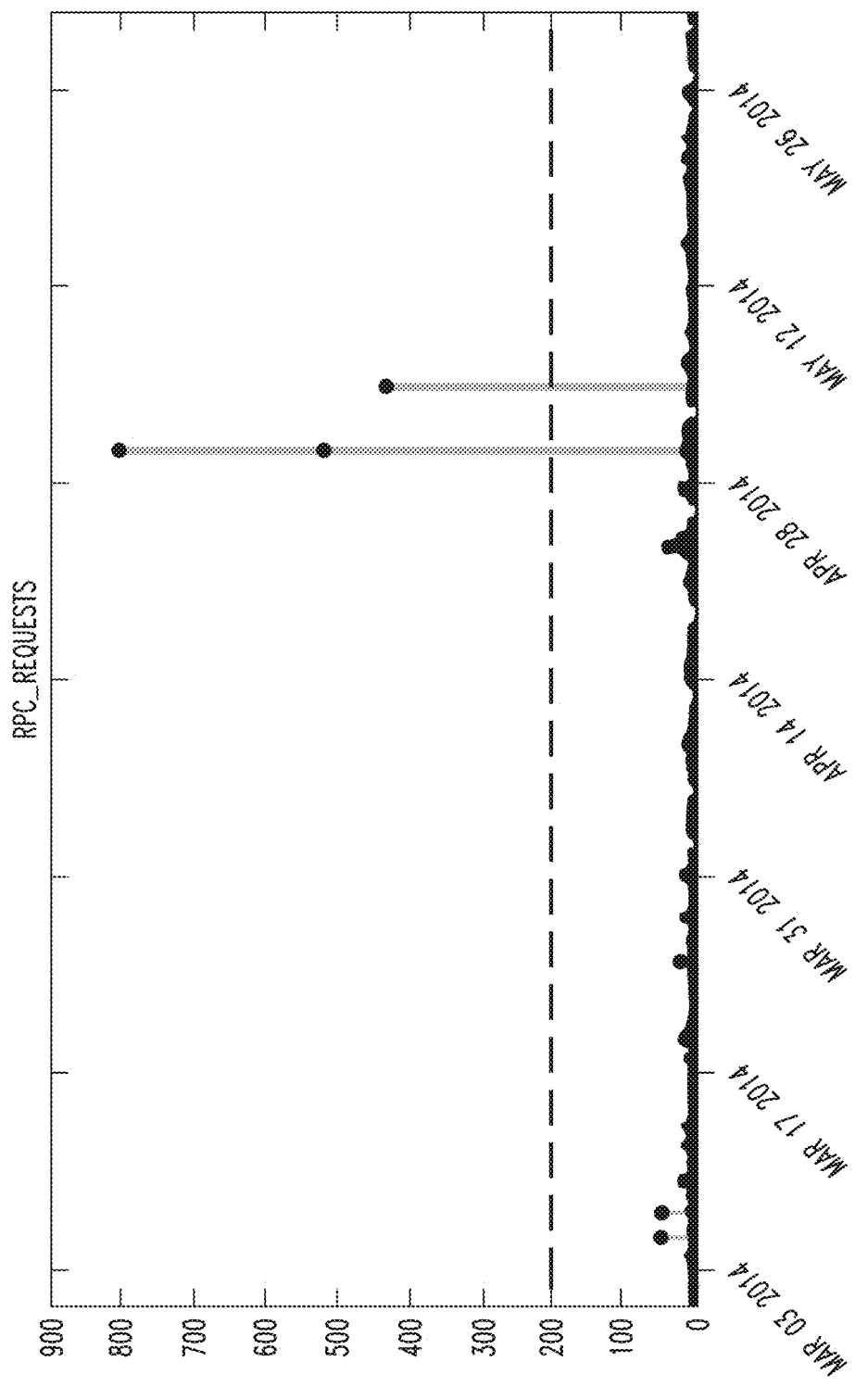

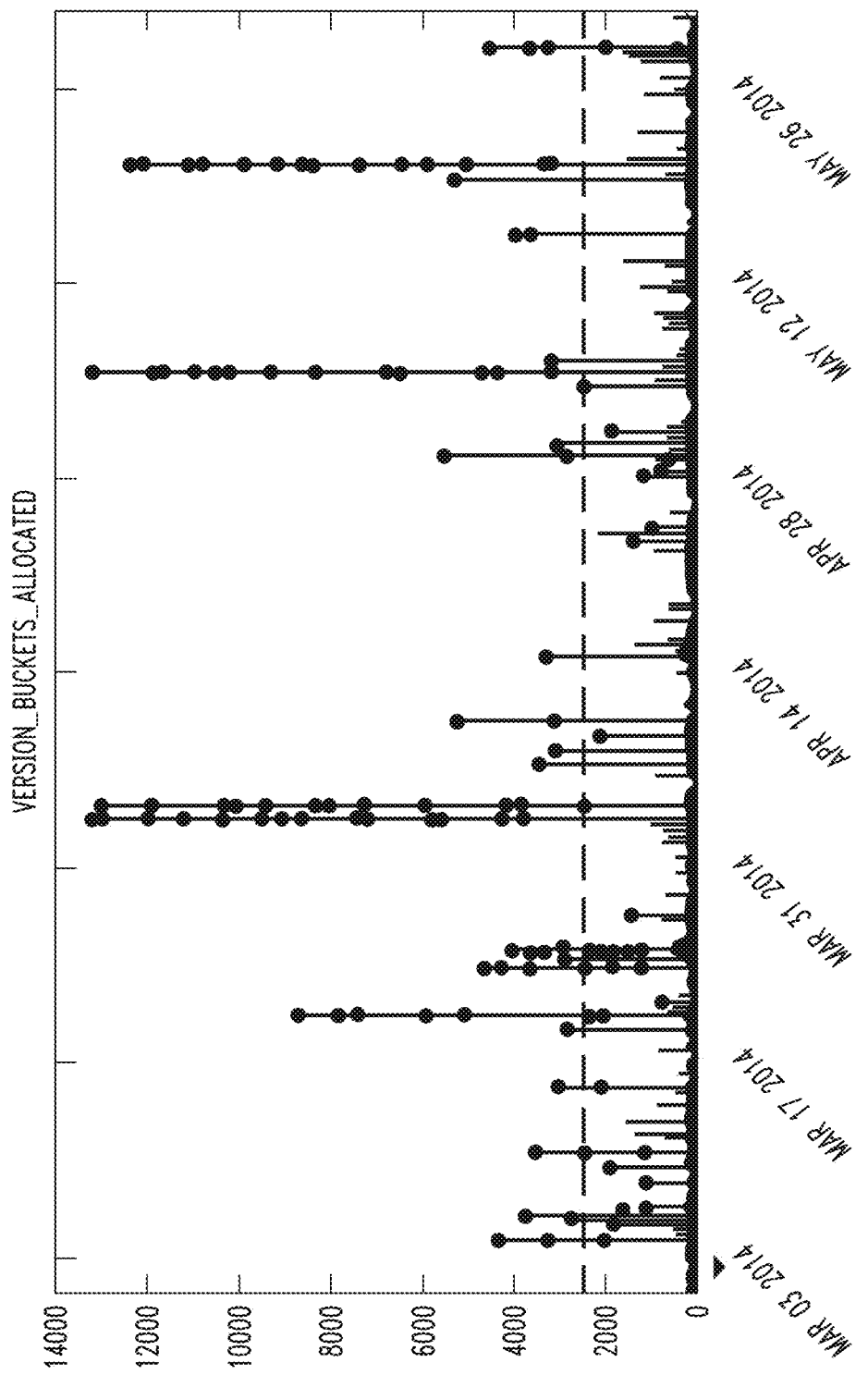

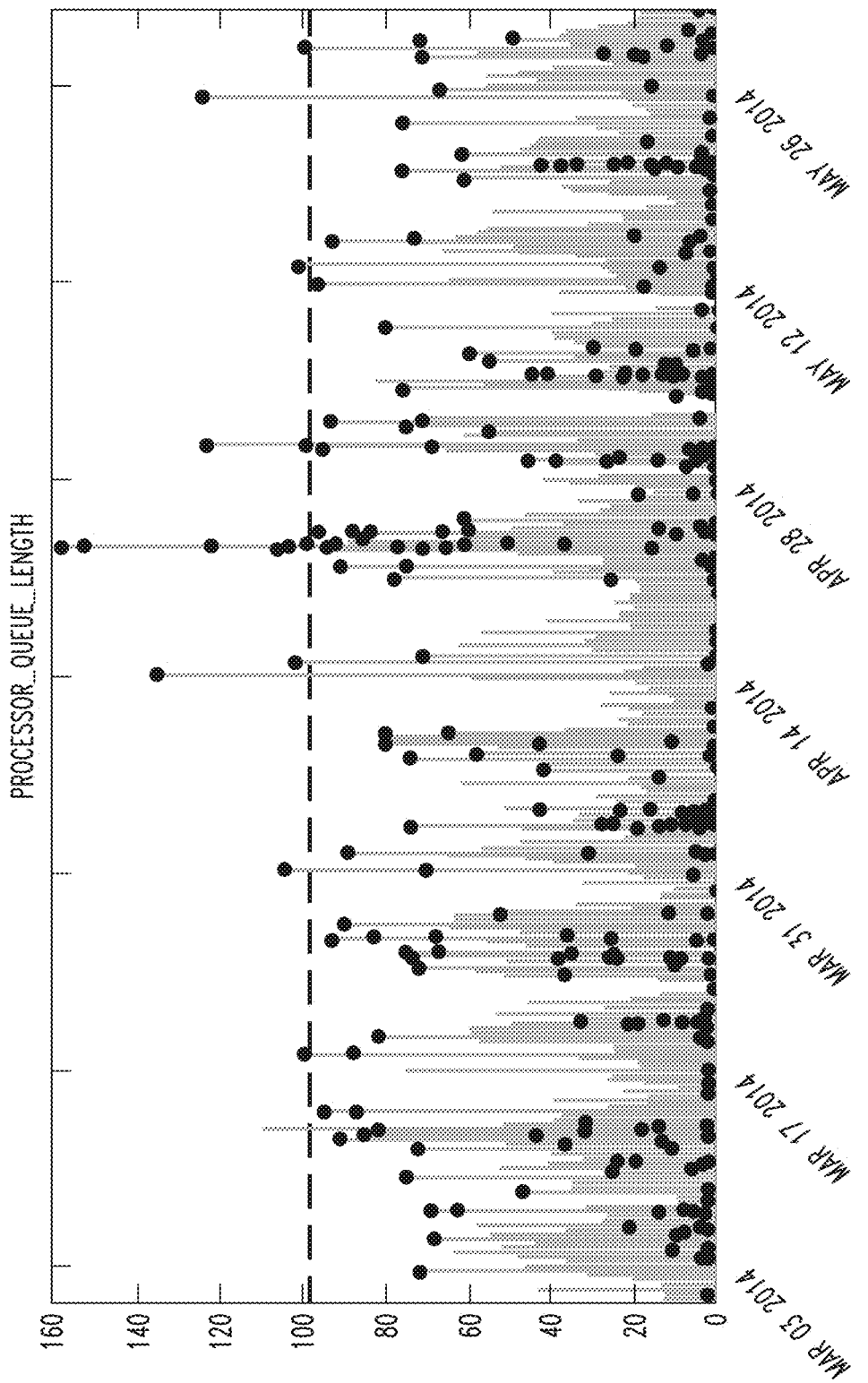

FIG. 6A-1 (FORECAST)
FIG. 6A-2 (ACTUAL)

FIG. 6B-1 (FORECAST)
FIG. 6B-2 (ACTUAL)

FIG. 6C-1 (FORECAST)
FIG. 6C-2 (ACTUAL)

FIG. 6D-1 (FORECAST)
FIG. 6D-2 (ACTUAL)

METHOD AND APPARATUS FOR PREDICTIVE BEHAVIORAL ANALYTICS FOR IT OPERATIONS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application claims the benefit of U.S. Provisional Patent Application Ser. No. 61/893,932 entitled "SERVICE OUTAGE PREDICATION LEVERAGING BIG DATA ANALYTICS" filed on Oct. 22, 2013, the teachings of which application are hereby incorporated herein by reference in their entirety.

TECHNICAL FIELD

This application relates to predictive behavioral analytics and, more specifically, to predictive behavioral analytics in an information technology (IT) operations environment.

BACKGROUND

Information technology (IT) operations environments house a large number of applications required by the business for daily operation (e.g., security and authentication applications, messaging applications, backup and recovery applications, etc.). Monitoring these applications requires a multi-sourced and multi-tiered approach: (1) sampling and monitoring performance metrics such as CPU, memory, storage, etc.; (2) collecting and analyzing log data derived from each application; and (3) monitoring network traffic.

Each of these sources of information requires unique monitoring tools to collect, analyze, and store the relevant metrics and, in many cases, the monitoring tool is unique for each application (e.g., Exchange messaging systems might be monitored by a specific tool while the authentication and security environment might require a different tool). Moreover, even when monitoring the same source of information, such as performance metrics, each application and, at times, each server that is part of the application deployment, requires specific thresholds to be defined over each of the performance metrics that require monitoring.

SUMMARY

Example embodiments of the present invention relate to a method, an apparatus, and a computer program product for predictive behavioral analytics for information technology (IT) operations. The method includes collecting key performance indicators from a plurality of data sources in a network. The method also includes performing predictive behavioral analytics on the collected data and reporting on results of the predictive behavioral analytics.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 4A-4C are graphs illustrating time series of events according to respective example embodiments of the present invention;

FIGS. 5A-5H are graphs illustrating time series of events for respective performance counters according to respective example embodiments of the present invention;

FIGS. 6A-1-6D-3 are graphs illustrating time series of forecast, actual, and residual performance counter values according to respective example embodiments of the present invention;

DETAILED DESCRIPTION

Figure 1:
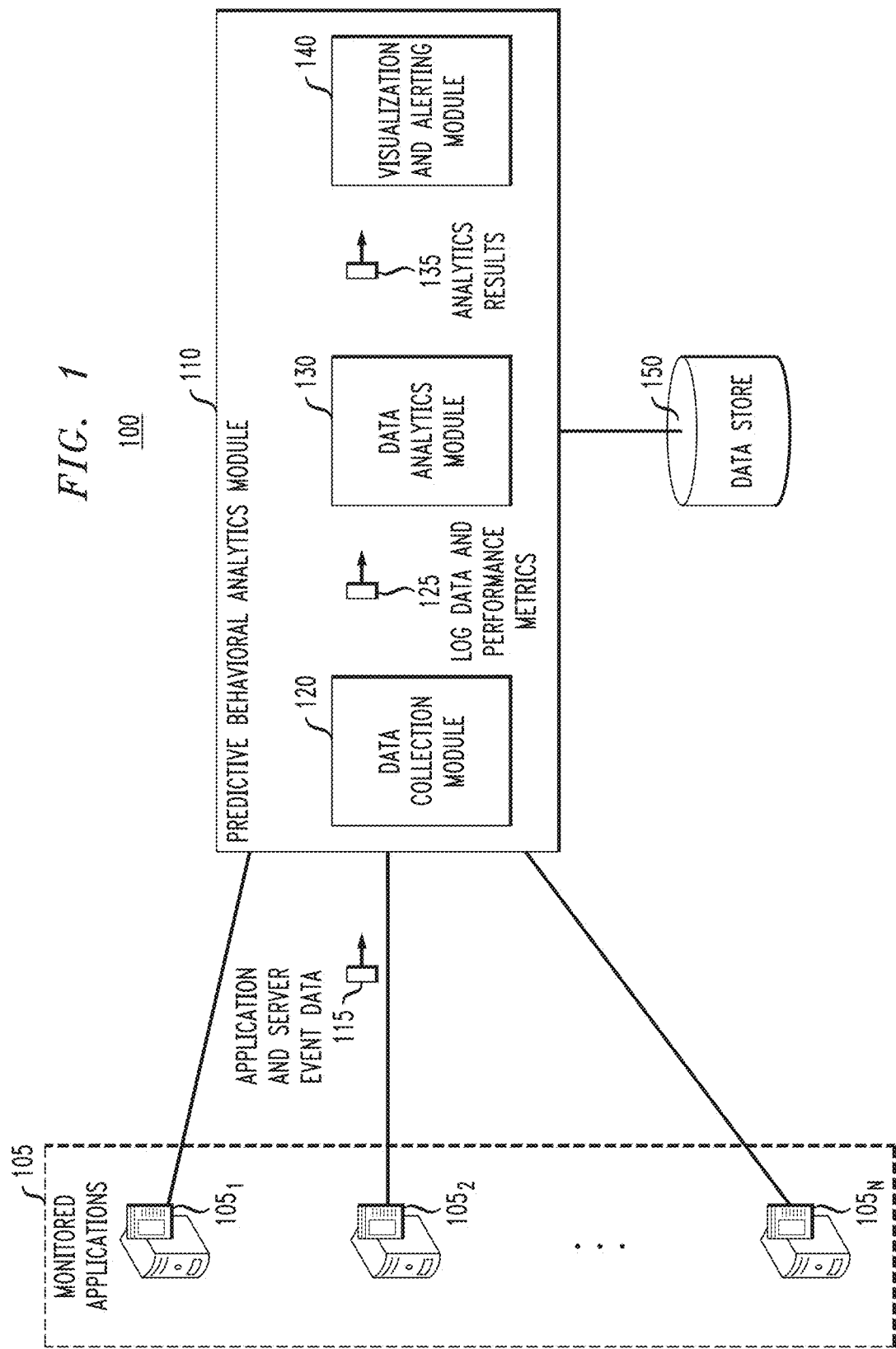
FIG. 1 is a block diagram illustrating a system according to an example embodiment of the present invention.

Information technology (IT) operations teams are overwhelmed by thousands of alerts per day. The number of alerts is growing rapidly as application and system components are becoming increasingly instrumented. Many of the alerts are false positives and yet there are many issues that go undetected. The challenge of managing thresholds for individual components let alone understanding what a given alert means for a complex system is becoming too much for humans to deal with using traditional approaches. Existing monitoring solutions are also "silo-ed" and confined to one layer, which makes finding root-cause for complex issues a time-consuming and expensive task.

Further, IT operations costs are rising rapidly. Enterprise IT operations teams are faced with rapidly growing numbers of alerts and events that are increasingly difficult to process effectively. This is overwhelming operations teams just as the demands on them are increasing. Moreover, a lot of the functionality provided by IT monitoring tools is increasingly delivered out of the box or bundled with element managers. At the same time, customers are being frustrated with the high-cost and limited success of framework managers and incident management systems. Customers are willing to pay more for innovation and new approaches that offer the prospect of genuinely improving the efficiency and effectiveness of IT operations.

This is happening in a context where the applications deployed internally and to customers need greater consistency of performance and reliability. This requires that IT operations teams are proactive and able to identify problems that are occurring across siloes. However, traditional approaches are only able to go so far in achieving proactivity and consistency. Rather, new ways of understanding and monitoring systems using people, processes, and tools are needed to meet the needs of modern businesses.

Current monitoring tools do not easily support combining multiple sources of information to obtain a holistic view of the application's and environment operation and though there exists an abundance of tools to monitor performance metrics and log data, combining the insights from looking at these two sources of information is challenging. Former approaches to monitoring performance, log and network data: (1) sample and threshold performance metrics individually (e.g., VMware® vCenter™ Operations (VCOps), EMC® SMARTS®, NetIQ®, and EMC® Watch4Net®), some apply automatically tuned thresholds over specific performance metrics; (2) collect, store, and query log data from multiple servers or applications (e.g., VMware Log Analyzer, Splunk, and LogStash); (3) collect, store, and query network traffic. Almost all of the monitoring tools provide a platform for collecting, storing, and querying the data (i.e., performance, log, and network data) and leave the tuning, tweaking, and optimization of thresholds and queries to the operator.

Traditional monitoring tools focused on event capture and filtering are being joined by a new generation of tools and services that apply statistical regression analysis to IT event data. We are also seeing development of products and services that aggregate IT monitoring data (telemetry) in cost-effective, scalable repositories in which the principles of data-science can be applied. The predictive analytics segment is moving into rapid growth. Within that segment, VMware VCOps, for example, applies statistical analysis to understand the normal behavior of infrastructure and IT components to improve alerting. These tools have custom query languages that allow ordinary IT operations people to search for specific events across systems, graph, and visualize monitoring data, and do basic event correlation.

There is also an emerging market for services-led approaches that allow data scientists to perform complex predictive analytics, including the use of customized machine learning, across the bulk of the monitoring data being produced within an IT environment.

Accordingly, example embodiments of the present invention apply principles of statistical analysis and machine learning used in data science to IT monitoring data and identify events and trends that correlate with issues in IT landscapes. Further, example embodiments of the present invention use these techniques to increase the efficiency and effectiveness of IT operations teams by: (1) maximizing the useful information contained in generated alerts, (2) ensuring that the alerts that are surfaced in the network operations center (NOC) are actionable (i.e., reduce white noise to maintain mission critical applications), (3) building the ability to understand, track, and model the behavior of the complex systems that make up IT environments, and (4) increasing the consistency and detail for finding the root-cause of complex system issues and incidents.

Example embodiments of the present invention collect, analyze, store, and visualize key performance indicators as well as provide an aggregated health score of network components in a network infrastructure. Further, example embodiments of the present invention fit a behavioral model to both performance metrics and log data, learn the behavior of the system over time, and alert whenever the system is not behaving in a manner that is normal. By incorporating multiple sources of information, applying machine learning, time-series and statistics to IT operations monitoring, example embodiments of the present invention are able to provide an almost completely automated system that requires little tuning and is capable of learning, tracking, and alerting on abnormal behavior of IT applications. In other words, in example embodiments of the present invention, the system utilizes concepts from time-series analysis, information theory, text analysis, and machine learning to provide a holistic view of the behavior of an application/server by intelligently combining multiple sources of information, thereby reducing the overhead required by a domain expert and the amount of noise generated by conventional and non-optimized monitoring systems.

In a preferred embodiment, the system collects and analyzes data and meets the following criteria: (1) self contained (i.e., no external products are required), (2) scalable (horizontally), (3) centrally managed, (4) agentless, (5) provides end-to-end visibility of services health and business process impact, (6) improves service availability and quality (e.g., predicts and prevents unplanned service downtime and reduces time to restore services), (7) increases staff productivity (e.g., eliminates noise and false positives, enhances triage and troubleshooting capabilities, and automates and implements self-healing mechanisms), and (8) simplifies tool set and processes.

FIG. 1 is a block diagram illustrating a network 100 according to an example embodiment of the present invention. FIGS. 2A-2G are flow diagrams illustrating methods according to respective example embodiments of the present invention. FIG. 1 and FIGS. 2A-2G may be described in conjunction.

As illustrated in FIG. 1, the example embodiment system includes a plurality of monitored applications $105_1$-$105_N$ (105 generally) and a predictive behavioral analytics module 110. The predictive behavioral analytics module 110 may include a data collection module 120, a data analytics module 130, and a visualization and alerting module 140.

Figure 2A:
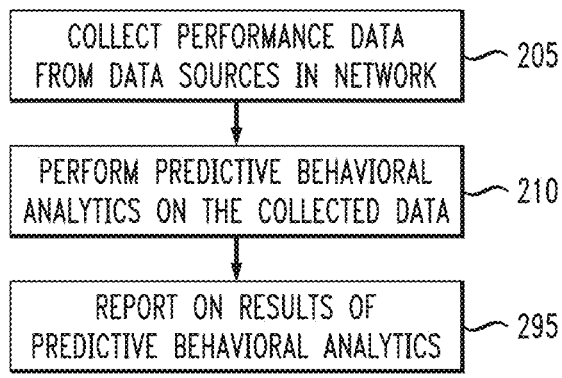
FIGS. 2A-2F are flow diagrams illustrating methods according to respective example embodiments of the present invention.

As illustrated in FIG. 2A, the data collection module 120 may collect performance data from a plurality of data sources in the network (e.g., network, application, and system logs) 100 (205). For example, the data collection module 120 may collect application and server event data 115 from the monitored applications 105 and the servers/hosts on which they operate and store the event data 115 to a data store 150 for analysis. It should be understood that the servers/hosts may be either physical or virtual machines. Data collection may be conducted in parallel from the plurality of monitored applications 105 using several data collection servers controlled by a client software such as via an application programming interface (API).

The event data 115 may include both event logs and performance counter data for a predefined set of a plurality of key performance indicators in the network. It should be understood that there may be thousands of key performance indicators available; however, in example embodiments of the present invention, a plurality of selected key performance indicators may be selected for collection of performance data for analysis and visualization.

Events logs from monitored application 105 may be collected, parsed, and saved into a structured format and matched against specific event identifiers (IDs) and severity levels provided in the events and text content (i.e., description) of the events. Further, application and performance counters, as well as system and application logs, may be remotely collected from each of the servers/hosts. The event data then may be inserted into the data store 150 (e.g., a Greenplum® database) for storage and analysis. The data store 150 may store raw event data as well as analyzed data (e.g., tracking mechanisms and residuals), as will be described in greater detail below, for training a statistical model and for future use to refine the statistical model and to build a more complex model based on that feedback. Further, in certain embodiments, a number of operations may be performed on the data in memory of the predictive behavioral analytics module 110.

Performance counters from each application/server 105 may be tracked in a database (e.g., data store 150) by a time series, behavioral machine learning algorithm. As will be described in greater detail below, in a preferred embodiment, once a model is fitted to the performance counters signal, example embodiments of the present invention may identify new samples from that server that do not fit the server's modeled expected behavior and alert, for example, an event management team. It should be understood that performance counters may vary with the application 105 being monitored. For example, performance counters for Microsoft Exchange may include:

MSExchange Information Store (IS)\Remote Procedure Call (RPC) Averaged latency—records the average time, in milliseconds (ms), that it takes for the last 1024 packets to be processed by the store;

MSExchange IS\RPC Requests—number of client computer requests that are currently being processed within the store process;

MSExchange Database Instances\Log Generation Checkpoint Depth\Informationstore_total—the work, in a count of log files, that will need to be redone or undone to the database files if the process crashes;

MSExchangeis mailbox \Slowfindrowrate\_total—Shows the rate at which the slower FindRow needs to be used in the mailbox store. Higher values indicate applications are crawling or searching mailboxes, which is affecting server performance;

MSExchange Database\Version Buckets Allocated\Informationstore—Shows the total number of version buckets allocated. Version buckets are outstanding message queue database transactions that are kept in memory;

System\Processor Queue Length—shows how many threads are ready in the processor queue, but not currently able to use the processor; and Processor(_Total)\% Processor Time—determines the percentage of time the processor is busy by measuring the percentage of time the thread of the Idle process is running and then subtracting that from 100 percent.

As described below with regard to FIGS. 2B-2F, the data analytics module 130 may retrieve log data and performance metrics 125 from the data collection module 120 and then may perform predictive behavioral analytics regarding IT operations on the collected performance data (210) and report on results of the predictive behavioral analytics (295), such as via a network operations client application (as illustrated in FIGS. 7 and 7A-7G).

Log Data

Figure 2B:
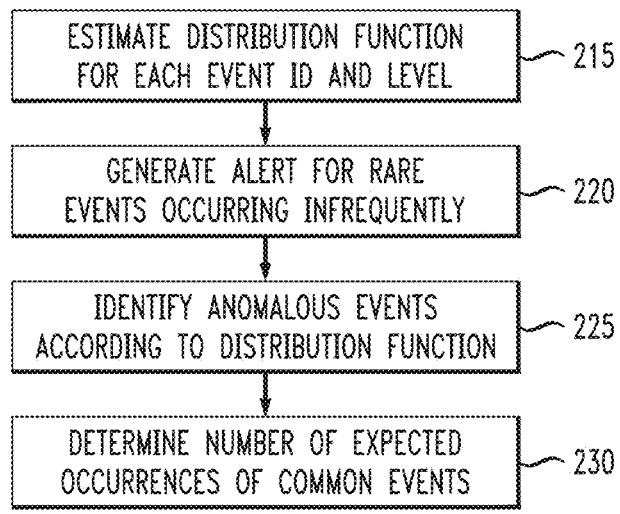

As illustrated in FIG. 2B, to perform behavioral analytics regarding IT operations on the log data within the collected performance data (210), the data analytics module 130 may apply information theory and time series approaches to the log data. For example, the data analytics module first may estimate a distribution function for each event ID and alert level in the log data (215).

For rare events occurring infrequently according to the distribution function, or for events having an alert level at or above a particular critical level, example embodiments of the present invention may generate an alert (220). Example embodiments of the present invention then may identify anomalous events from the log data according to the distribution function (225).

To determine what qualifies as anomalous, example embodiments of the present invention may set a probability threshold for each event ID according to the distribution function then and identify events outside of the probability threshold. Table 1 illustrates a plurality of log events:

TABLE 1

| Counter | Count |
| --- | --- |
| Total Number of Event Logs | 99798 |
| Total Number of System Event Logs | 11083 |
| Total Number of Application Event Logs | 88715 |
| Total Number of Critical System Event Logs | 45 |
| Total Number of Critical Application Event Logs | 0 |
| Total Number of Error System Event Logs | 218 |
| Total Number of Error Application Event Logs | 836 |
| Total Number of Warning System Event Logs | 90 |
| Total Number of Warning Application Event Logs | 8939 |
| Total Number of Information System Event Logs | 10730 |
| Total Number of Information Application Event Logs | 78940 |

Figure 3:
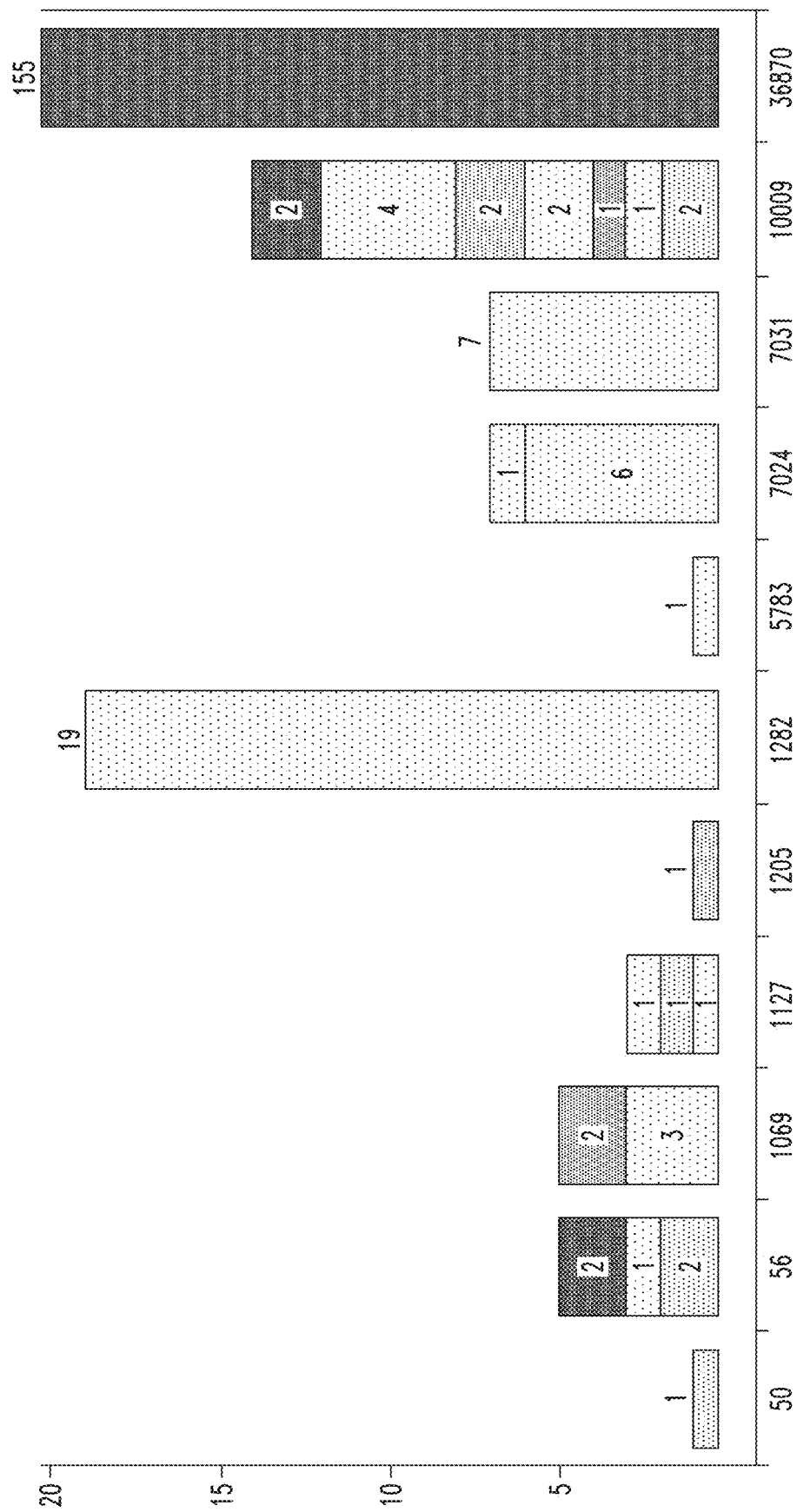
FIG. 3 is a graph illustrating a distribution of a plurality of error messages and event IDs.

As illustrated in Table 1, there are 218 system error events in the log data. The graph of FIG. 3 illustrates the distribution of error messages and event IDs. Alerts may be generated according to this distribution.

Figure 4A:
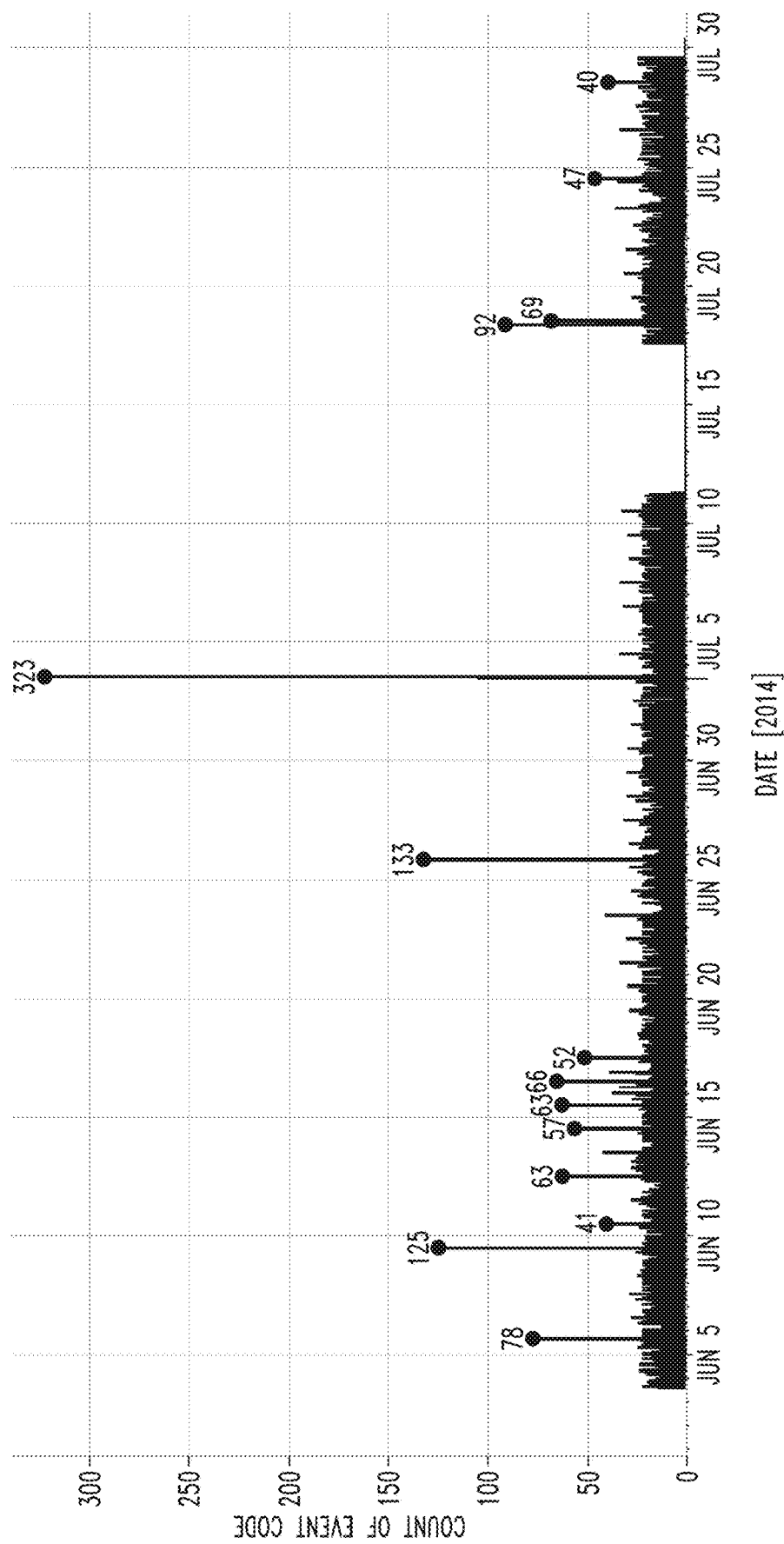
Figure 4B:
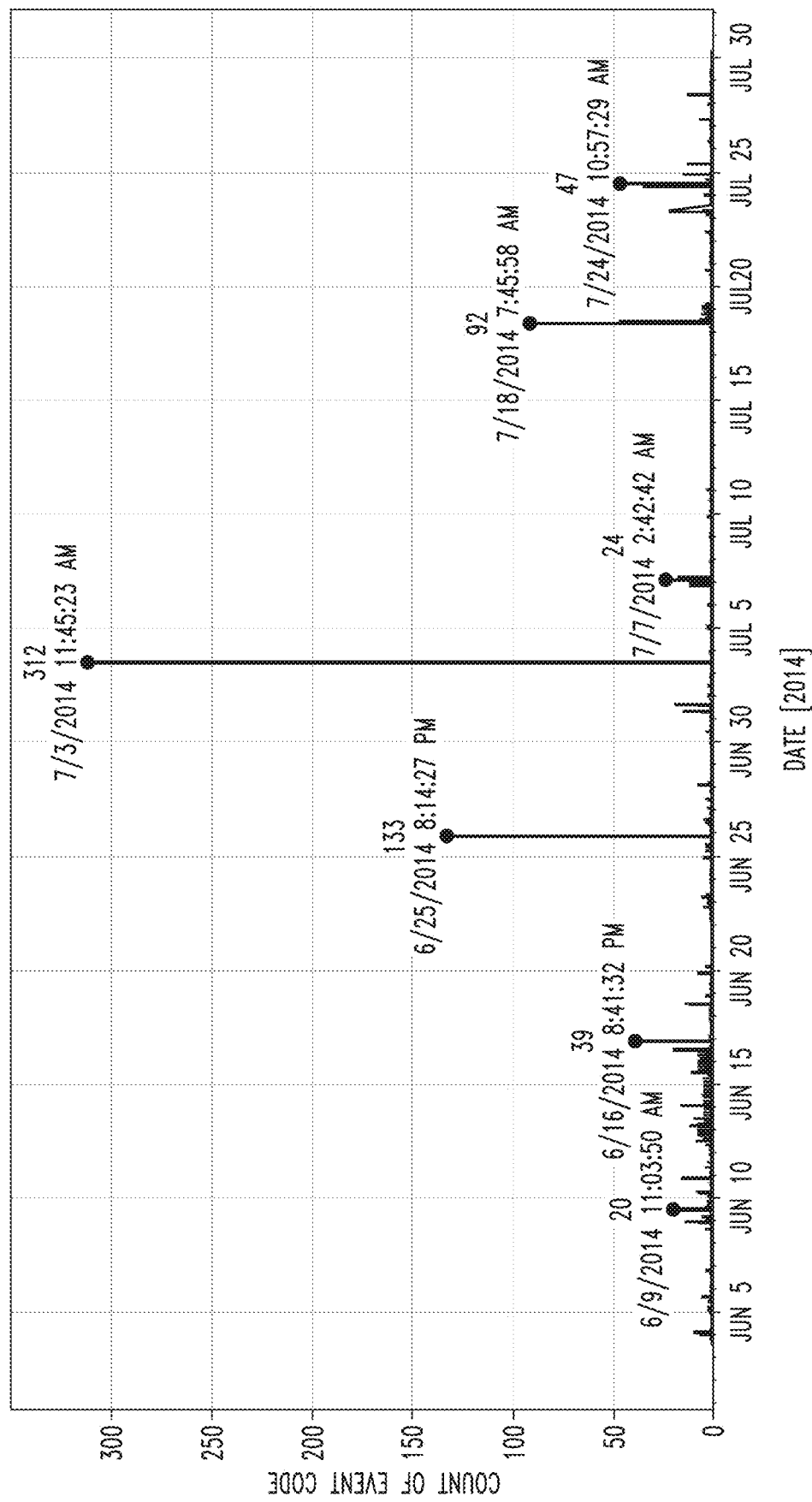

Conversely, for common events occurring frequently according to the distribution function, a time series approach may be applied to the log data to learn a normal behavior with respect to a number (i.e., volume) of expected appearances of each type of event ID in the sample data (230). FIGS. 4A-4C are graphs illustrating time series of events according to respective example embodiments of the present invention. According to example embodiments of the present invention the purpose of time series analysis is to determine whether there is a trend, bias, or seasonality to the events collected by the data collection module 120. It will be understood by one of ordinary skill in the art that it is not so useful for infrequent events; however, for event IDs that have a large number of occurrences in the data it can be used in order to detect abnormal behavior of the server/host.

FIG. 4A is a graph illustrating all events collected for a period of time without filtering the events by type, ID, or text. As illustrated in FIG. 4A, an outlier value of 323 events was recorded on July 2nd at 12 PM.

FIG. 4B is a graph illustrating events collected for the period of time but filtering out information events. As illustrated in FIG. 4B, a spike with the value of 312 caused by the following warning message: "An invalid event history watermark has been detected by background cleanup. The watermark will be deleted." Although there are still a great number of warning messages, the filtering of the informational events makes it clear that the occurrence of this event 312 times makes it clear that its occurrence was an anomaly.

FIG. 4C is a graph of a specific event ID across time. As illustrated in FIG. 4C, example embodiments of the present invention may observe that 22 events to 10 events having this event ID with the information message "Database redundancy health check passed" occur every hour, with the exception noted. Such an observation may prompt a user to determine the cause of the anomaly. Accordingly, it should be understood that, in example embodiments of the present invention, an anomaly need not be a value that exceeds a threshold or expected value but also may be a value that is below an expected value (i.e., a value that falls outside of an expected range of values).

Performance Metrics

Figure 2C:
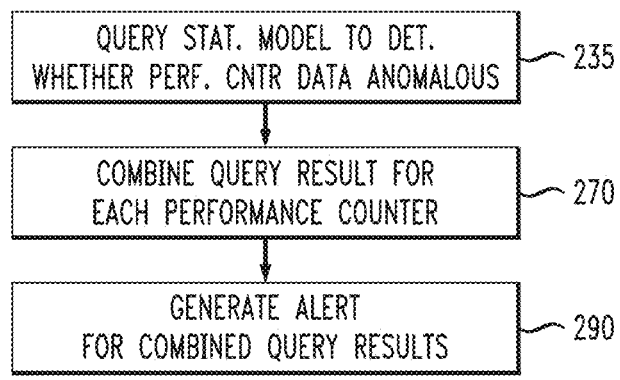

As will be described in greater detail below, many types of behaviors can be observed for different performance metrics. Accordingly, as illustrated in FIG. 2C, to perform behavioral analytics regarding IT operations on the performance counter data within the collected performance data (210), example embodiments of the present invention may query a statistical model to determine whether performance counter data for each respective key performance indicator in the network is indicative of an anomalous value (235).

Therefore, for tracking the normal behavior of each of these performance counters, time series methodologies may be applied (e.g., Holt-Winters model) to individually track each of these metrics. In example embodiments of the present invention, three components of the signal, Trend, Bias, and Seasonality, may be tracked using the following time-series equations:

Level $L_t = \alpha(y_t - s_{t-s}) + (1-\alpha)(L_{t-1} + b_{t-1})$;

Trend $b_t = \beta(L_t - L_{t-1}) + (1-\beta)b_{t-1}$;

Season $S_t = \gamma(y_t - L_t) + (1-\gamma)S_{t-s}$; and

Forecast $F_{t+k} = L_t + kb_t + S_{t+k-s}$;

where $L_t$ is the level at time t, $b_t$ is the trend at time t, $S_t$ is the season at time t, $y_t$ is the signal value at time t, and $\alpha$, $\beta$, and $\gamma$ are the learning coefficients for the level, trend, and season, respectively.

Figure 2D:
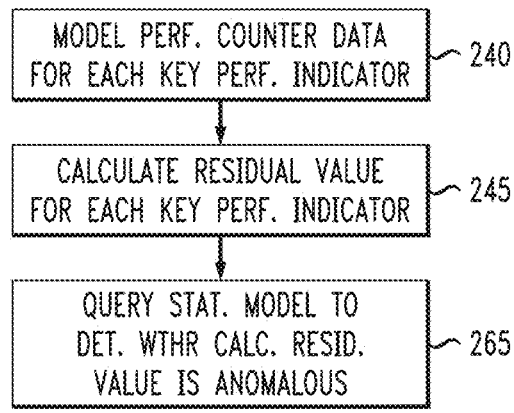
Figure 2E:
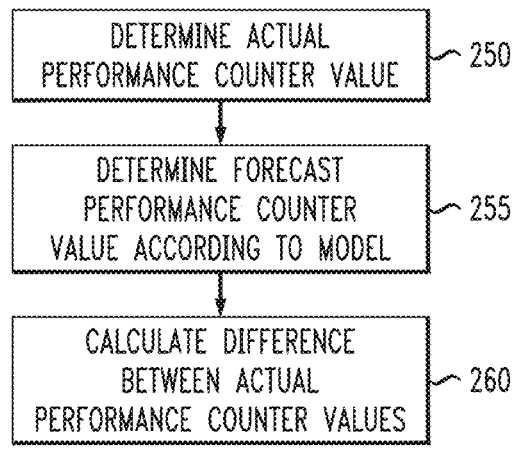

As illustrated in FIG. 2D, example embodiments of the present invention may model performance counter data for each respective key performance indicator (240) and calculate a residual value for each respective key performance indicator (245). As illustrated in FIG. 2E, these equations are applied to each of the monitored metrics to produce residuals by determining an actual performance counter value (250), determining a forecast performance counter value according to its respective model (255), and calculating the residual value as a difference between the forecast model (i.e., what the model expects to sample) and the actual performance counter value (i.e., the sample that was received) (260):

residual$_{t+k}$ = forecast$_{t+k}$ − actual$_{t+k}$.

In other words, example embodiments of the present invention calculate the difference between the expected counter value and the actual counter value to determine the residual. The residual then may be used to query a statistical model about whether the residual is a value that would have been expected from that particular performance counter. The output of the query is a probability (e.g., 0 (not expected and should alert) to 1 (expected a common value)). These values then may be fed into the visualization and alerting module 140 as analytics results 135.

For example, applying this approach over the metrics illustrated in FIGS. 6A-1, 6B-1, and 6C-1 provides the output illustrated in FIGS. 6A-2, 6A-3, 6B-2, 6B-3, 6C-2, and 6C-3. Therefore, according to the statistical model, it can be determined whether the calculated residual value is an anomalous value (265).

Figure 2F:
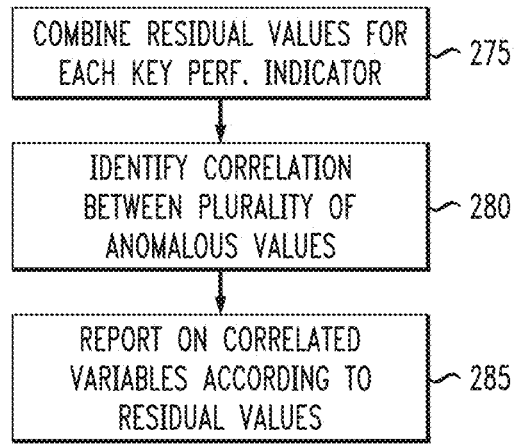

Results for each respective performance counter then may be combined (270) and an alert may be generated for the combined query results (290). For example, as illustrated in FIG. 2F, example embodiments of the present invention may combine the residual values for each respective key performance indicator (275) and identify a correlation between a plurality of anomalous values (280). To combine the individual residual values into a single health score for an application/server, a kernel distribution function may be used (e.g., Gaussian Mixture Model), which essentially ties all of the residuals, identifying a correlation between the variables and providing a single probabilistic score stating the system's health:

$$\lambda = \sum_{j=1}^{p} w_j N\left(\mu_j, \sum_j\right)$$

where $N\left(\mu_j, \sum_j\right) = \frac{1}{2\pi^{\frac{d}{2}}|\sum_j|^{\frac{1}{2}}} \exp^{-\frac{1}{2}(x-\mu_j)'\sum_j^{-1}(x-\mu_j)}$, where i represents a multi-variate normal distribution with mean and covariance matrix $\Sigma_j$. Example embodiments of the present invention then may report on the correlated variables according to the residual values (285).

Figure 5A:
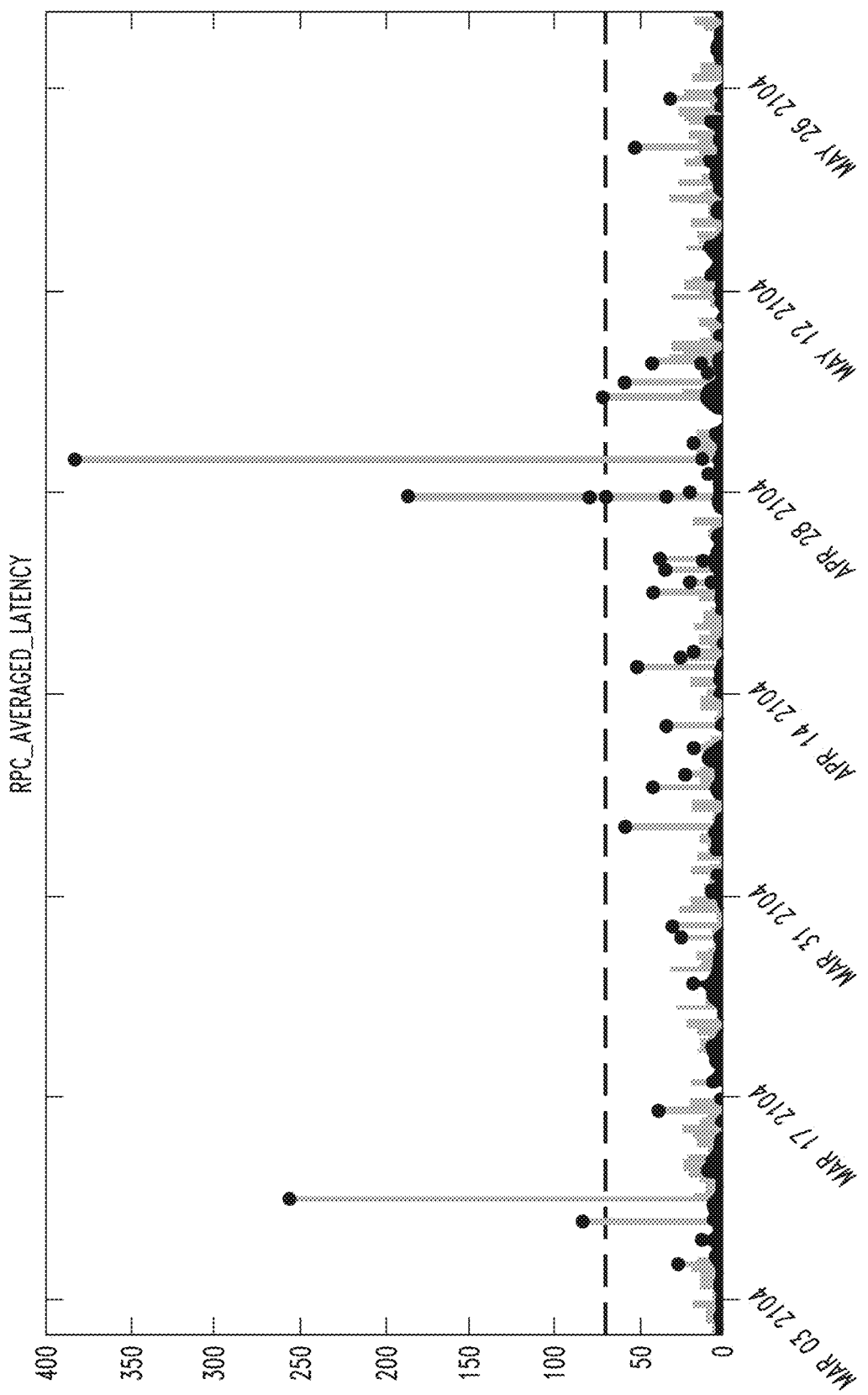
Figure 5C:
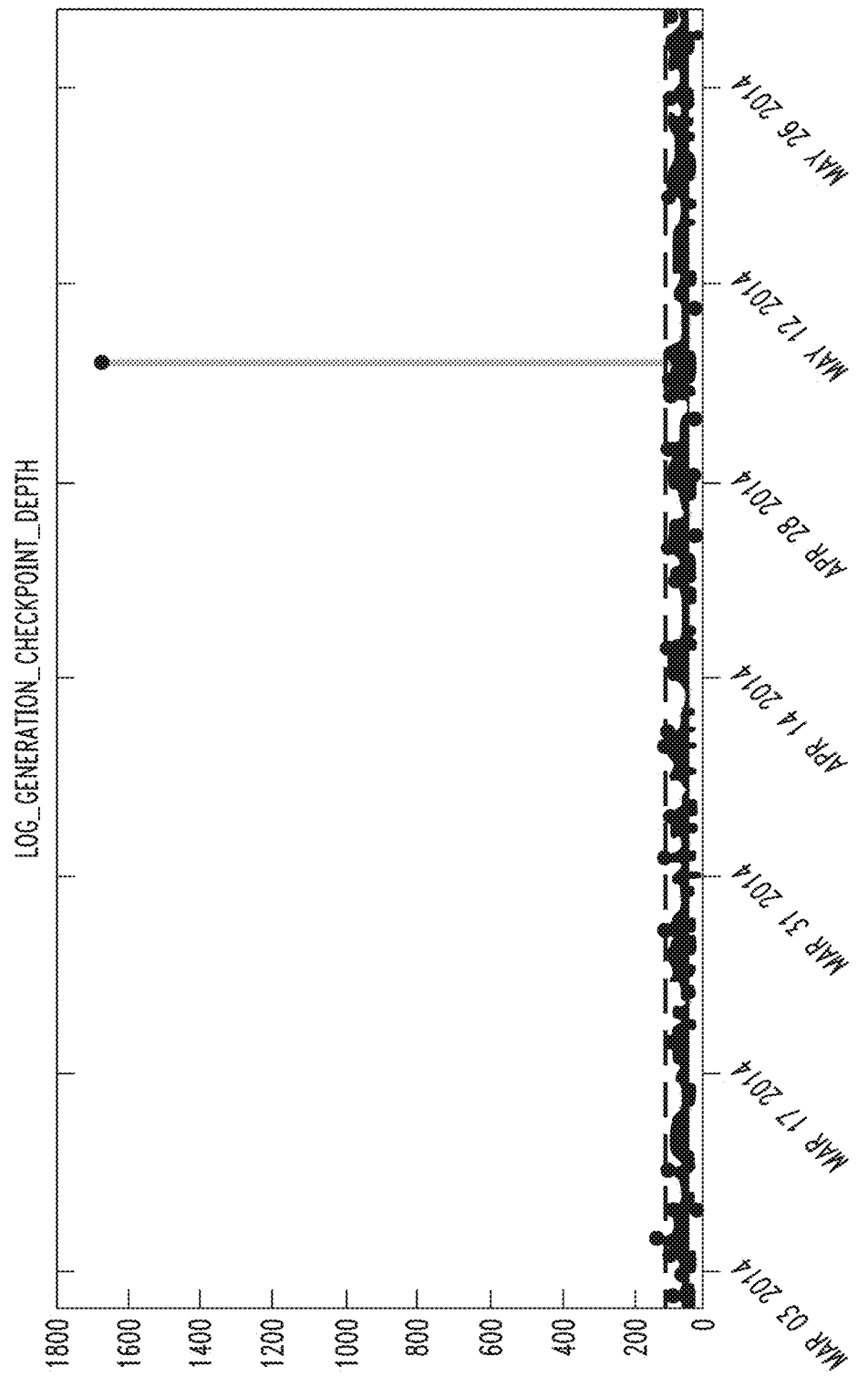
Figure 5D:
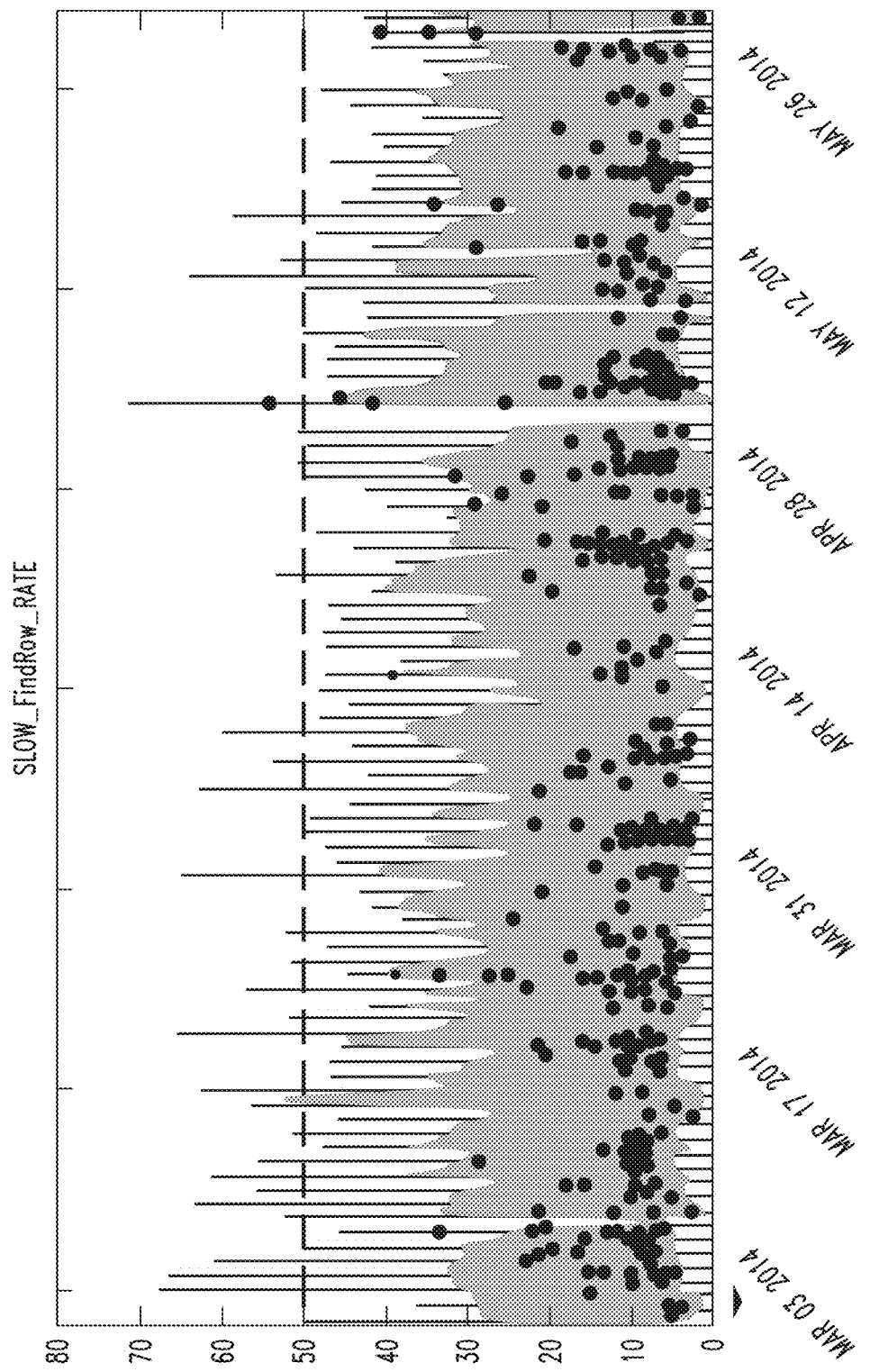
Figure 5G:
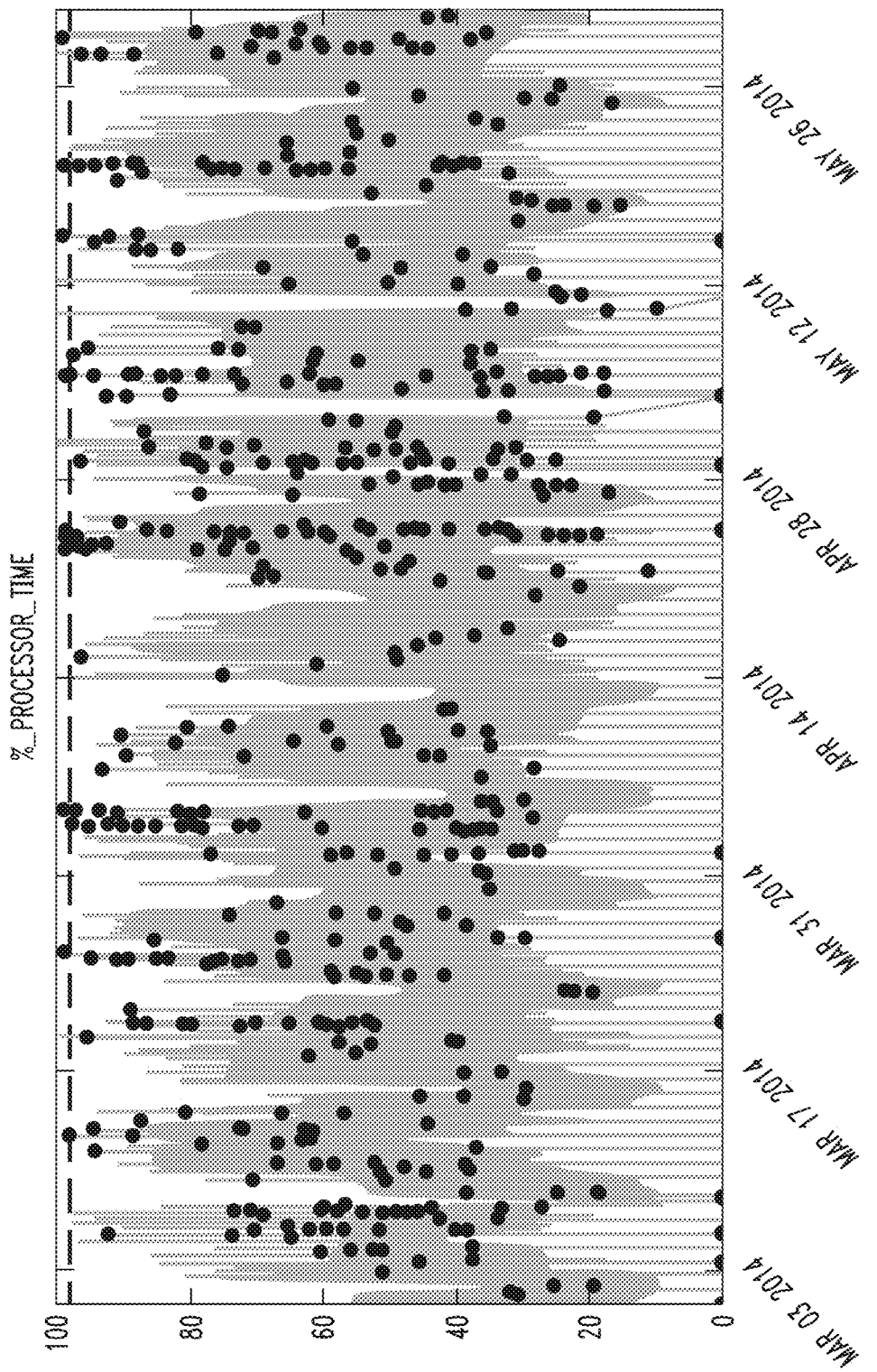

FIGS. 5A-5H are graphs illustrating time series of events for respective performance counters according to respective example embodiments of the present invention:

FIG. 5A: MSExchangeIS\RPC_Averaged_Latency;

FIG. 5B: MSExchangeIS\RPC_Requests;

FIG. 5C: MSExchange_Database(Information_Store)\Log_Generation_Checkpoint_Depth;

FIG. 5D: MSExchangeIS_Mailbox(Total)\Slow_Find-Row_Rate;

FIG. 5E: MSExchange_Database(Information_Store)\Version_Buckets Allocated;

FIG. 5F: System\\Processor Queue Length;

FIG. 5G: Processor(_Total)\% Processor Time; and

Figure 5H:
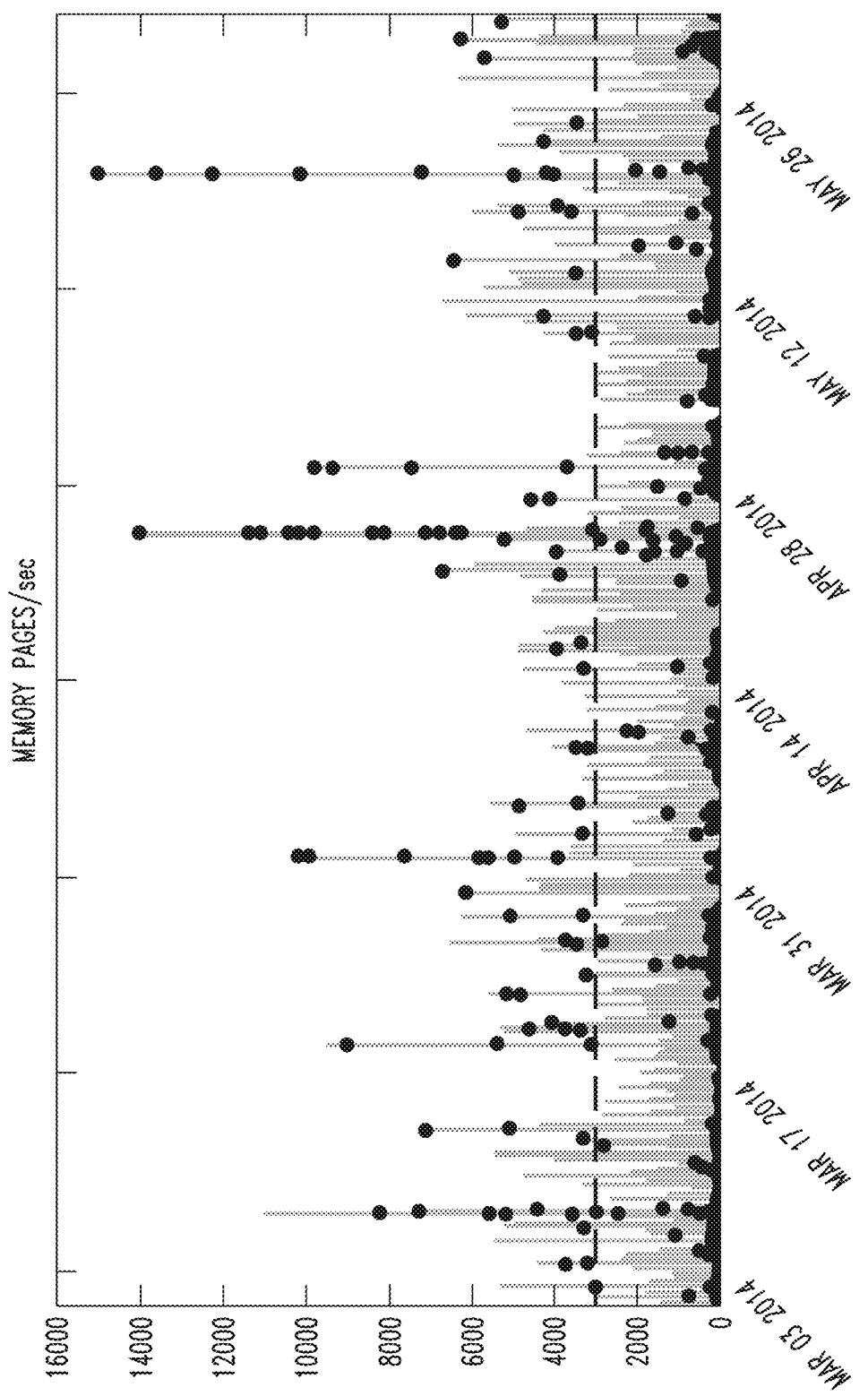
Figure 6A:
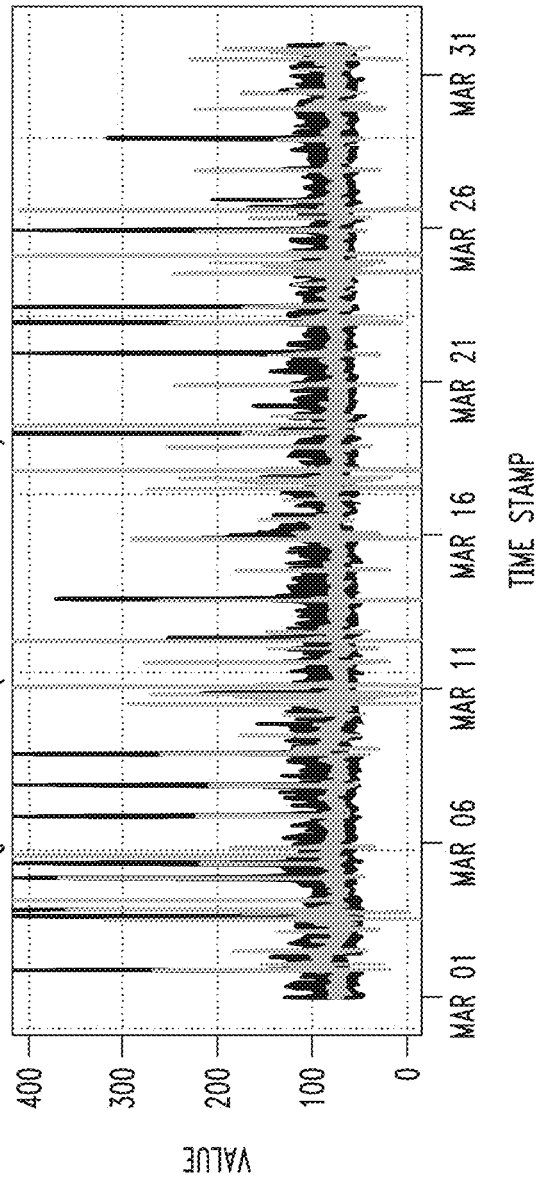
Figure 3:
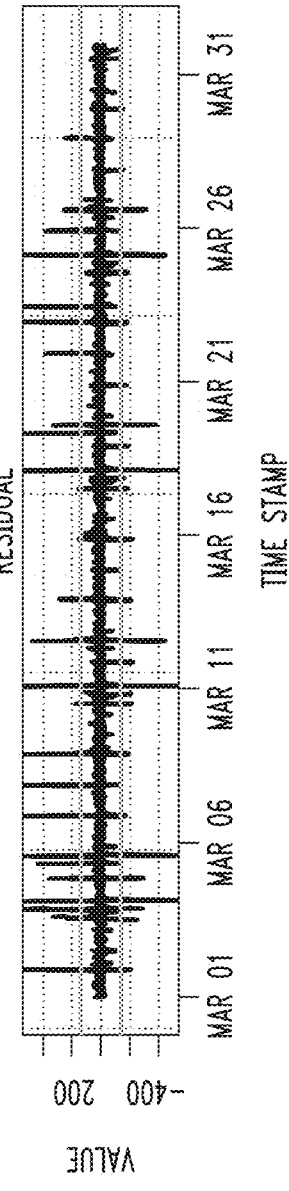
Figure 6B:
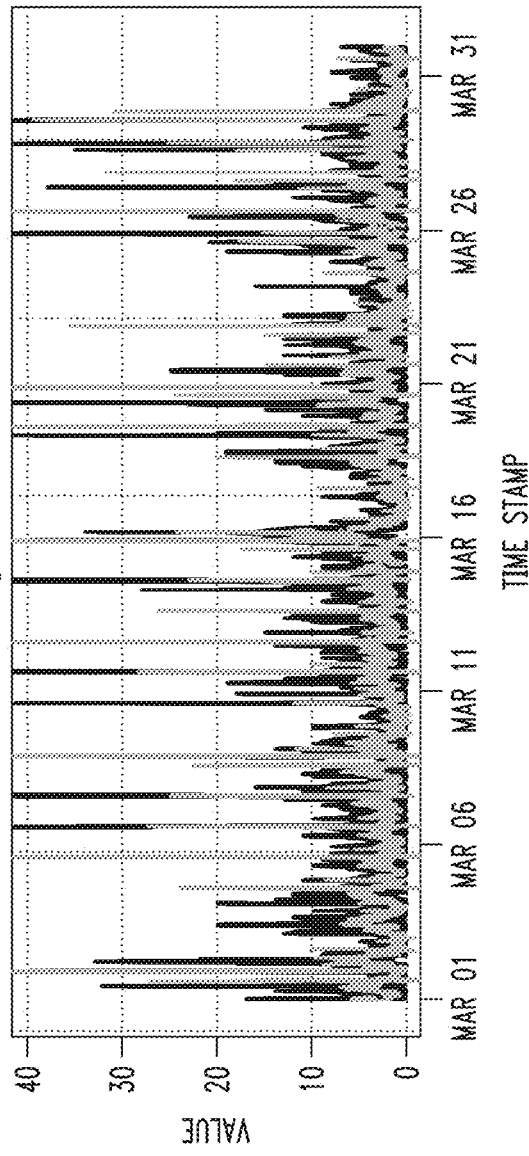
Figure 3:
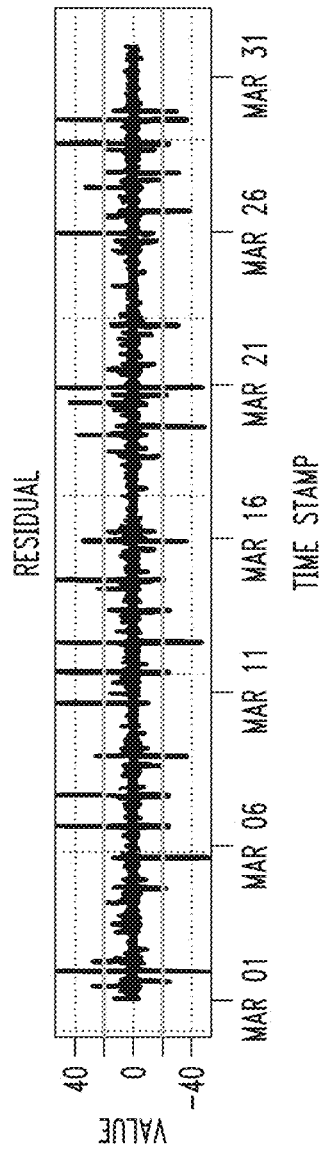
Figure 6C:
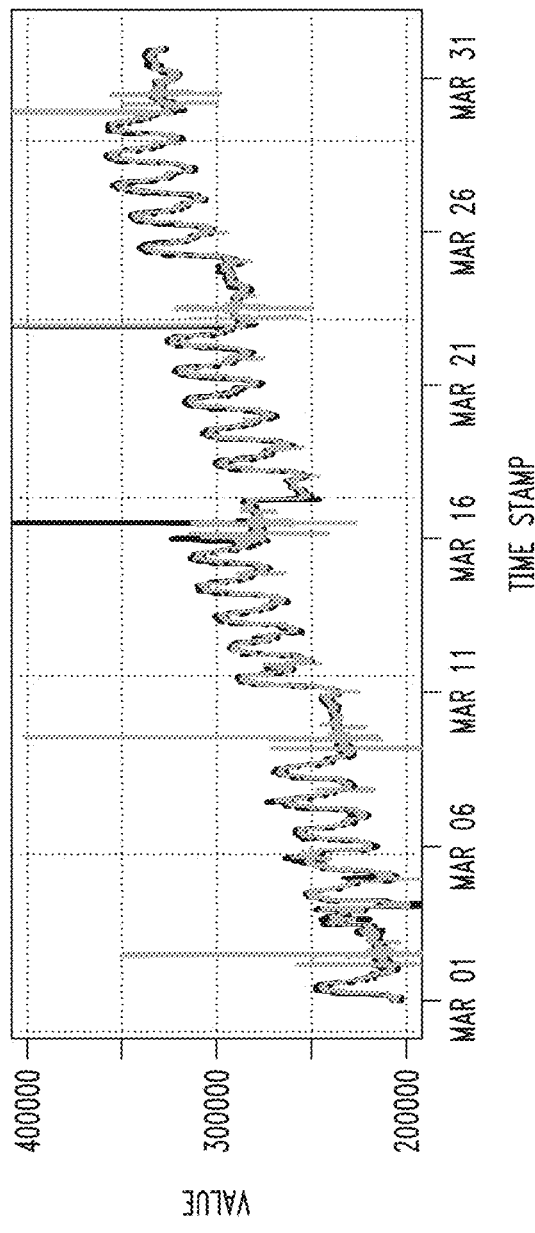
Figure 3:
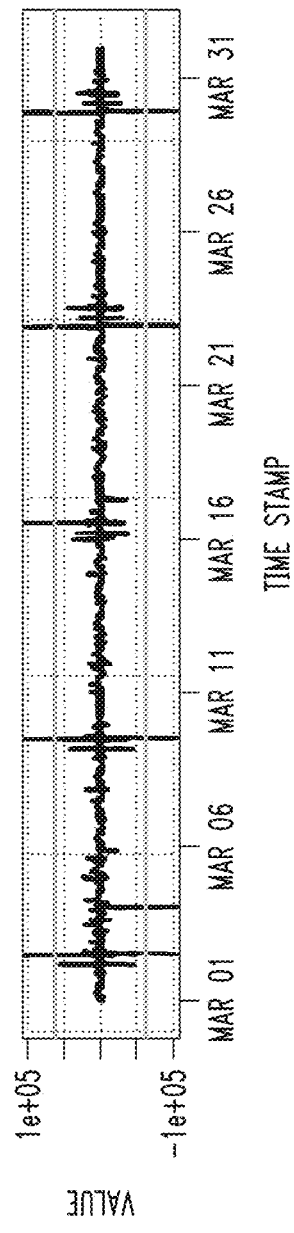
Figure 6D:
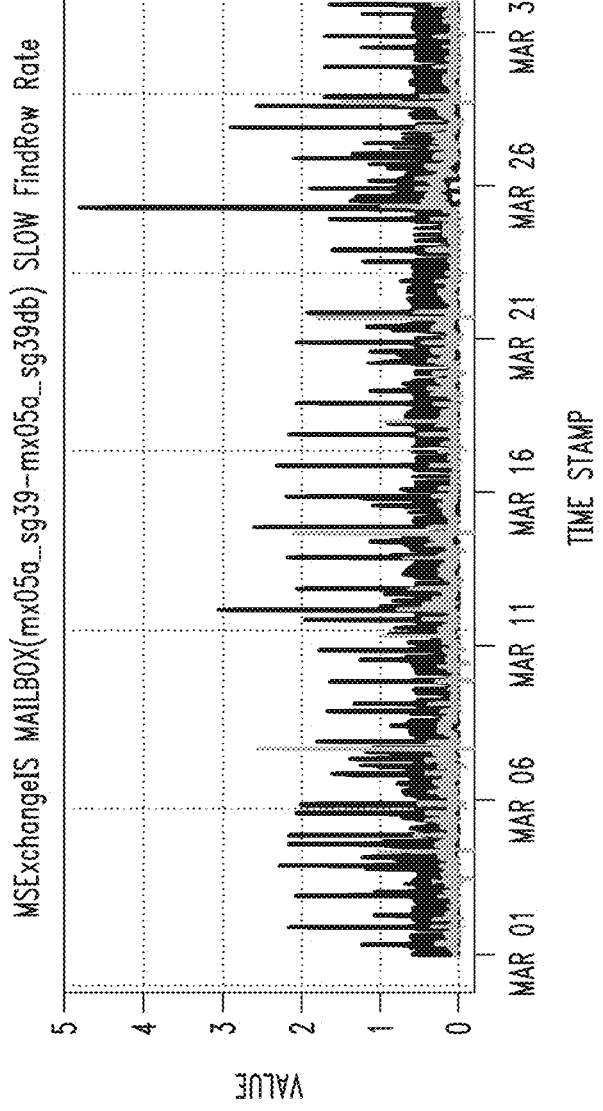
Figure 3:
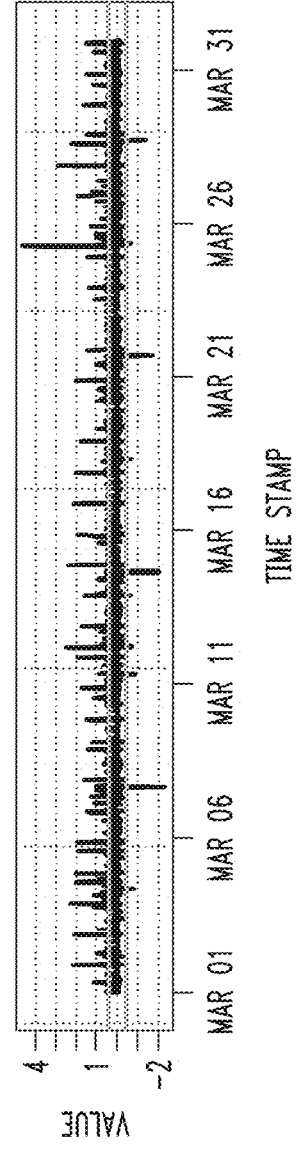

FIG. 5H: Memory\Pages/sec.

As illustrated in FIGS. 5A-5H, horizontal dashed lines represent thresholds and dots represent anomalies detected by the model output.

Table 2 summarizes the results of the performance counters, where "% Hit" is the percentage of predicted alerts matching actual alerts, "% Predicted" is the percentage of alerts predicted in advance, and "Avg. Predictive Time(sec)" is the average number of seconds in advance for predictive alerts.

TABLE 2

| Counter Name | # Alerts | % hit | % Predictive | # Reported in advance | Avg. Predictive Time (sec) | # GMM Alerts |
|---|---|---|---|---|---|---|
| RPC_Averaged_Latency | 7 | 100 | 57 | 4 | 330 | — |
| RPC_Requests | 3 | 100 | 33 | 1 | 120 | — |
| Log_Generation_Checkpoint_Depth | 357 | 10 | 4.5 | 16 | 457 | — |
| Slow_FindRow_Rate | 44 | 7 | 4.5 | 2 | 720 | — |
| Version_Buckets_Allocated | 153 | 94 | 81 | 124 | 469 | — |
| Processor_Queue_Length | 17 | 100 | 30 | 5 | 168 | — |
| Processor_Time | 138 | 55 | 47 | 65 | 512 | — |
| Memory Pages/sec | 1801 | 28 | 20 | 370 | 474 | — |
| Total | 2520 | 28 | 23 | 589 | 472 | 337 |

Therefore, according to this bifurcated method of performing predictive behavioral analysis on both log data and performance metrics, example embodiments of the present invention combine results into a single model illustrating a holistic view of the health of systems by learning from past behaviors). In summary, example embodiments of the present invention (1) apply machine learning to tracking for individual performance counters and (2) apply a learning algorithm to groups of performance metrics and to log data. In other words, example embodiments of the present invention track performance counters in a mathematically automated way by providing a model for each respective performance counter and then combining the residual values from each performance counter and, for log data, example embodiments of the present invention automatically identify rare and critical events and track the volume of common events.

Accordingly, example embodiments of the present invention are able to (1) automatically identify and always alert on critical and rare events, (2) automatically tack and alert on abnormal appearance of common and more usual logs (in agreement with the approach taken in the performance metrics analytics), and (3) combine performance metrics and log data statistics. It should be noted, however, that, in a preferred embodiment, the learning period for the model does not stop. In other words, model parameters may be continually updated and/or adapted for both performance metrics and log data. Therefore, example embodiments of the present invention are able to adapt to the dynamic nature of the monitored application 105 and the servers/hosts on which they operate.

Figure 7:
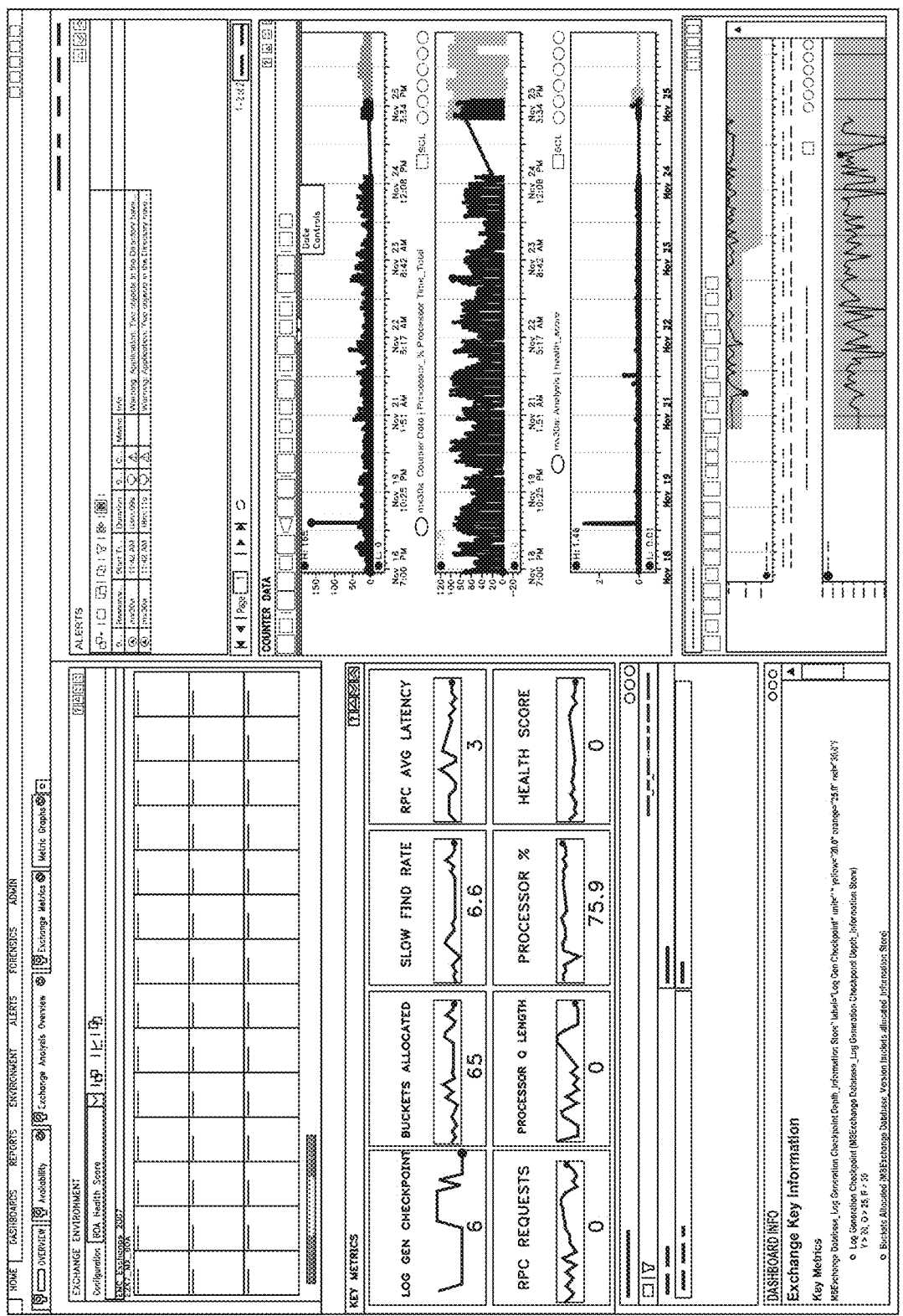
FIGS. 7 and 7A-7G are screen shots of a graphical user interface according to an example embodiment of the present invention.

FIG. 7 is a screen shot of a graphical user interface according to an example embodiment of the present invention. As illustrated in FIG. 7, the application may include a plurality of widgets, as will be described separately and in greater detail with regard to FIGS. 7A-7G.

As illustrated in FIG. 7, an IT operations management application (e.g., VMware® vCenter™ Operations Manager (VCOps)) may be used for visualization and alerts, thereby enabling IT personal to track, monitor, and remediate anomalous behavior for high-impact IT systems. For example, visualization of the predictive behavioral analytics may alert a user to abnormal behavior in log data, rare and unusual individual events, visualization/alert for operation team to use, as well as common events that appear more often but at an abnormal volume. It should be understood that alerts indicate anomalous behavior regarding other activities happening in the network and that something that might be affected on one server may provide insight into other server roles or services. It should also be understood that VCOps is one example of a graphical interface that can be used. Zabbix is an example of another graphical interface that can be used.

Figure 7A:
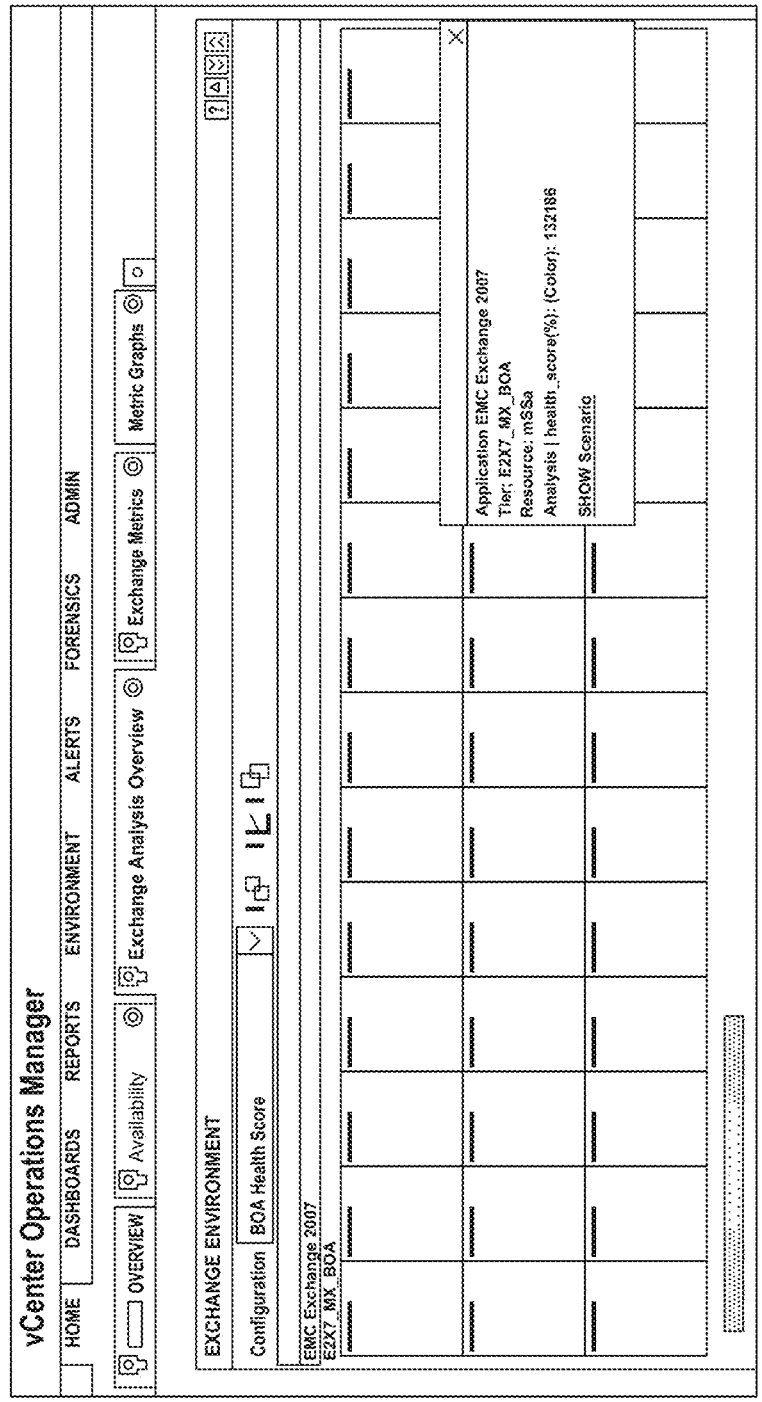
Figure 7B:
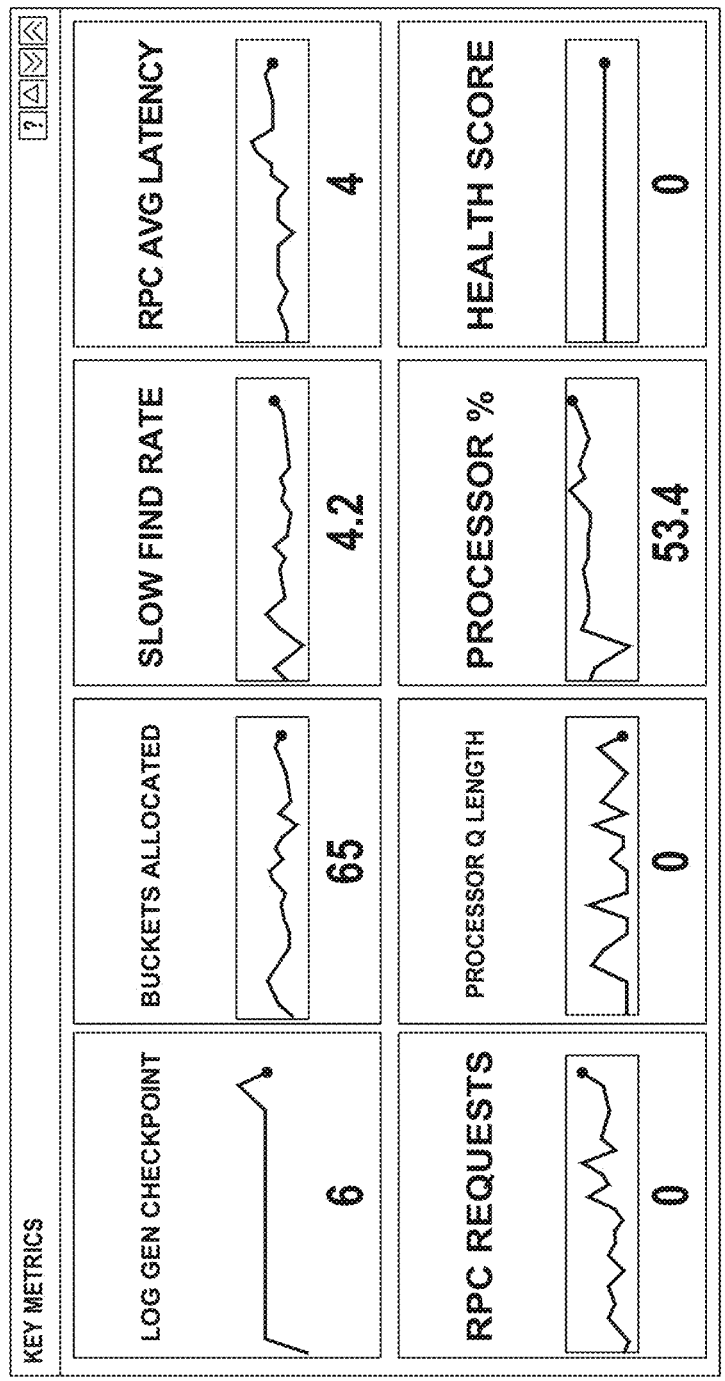

Accordingly, example embodiments of the present invention enable IT operations support team members to respond to an alert and then access an interface that will allow them to further investigate significance of the alert. For example, upon receiving an email alert or by visually monitoring the interface illustrated in FIG. 7, a user may make note of any red squares within the "heatmap" widget (FIG. 7A). The red square may indicate anomalous behavior for a specific server. The user then may click the red square (i.e., server) to update all widgets within the interface 700 for that particular server. The user then may analyze the health of the sever server by inspecting the health of the performance counters (FIG. 7B). The user also may review the performance counter history (FIG. 7F). As a result, the IT Operations user may determine whether further support is necessary, such as logging into the server to make a change in order to prevent, for example, an outage.

FIG. 7A is a screen shot of an Exchange Environment widget, according to an example embodiment of the present invention, providing a heat map 705 of servers in a network, with each square representing the health of a server in the network. In certain embodiments, "hovering" a mouse over a square will cause a "server ID" popup to appear providing detailed information regarding the selected server. Further, clicking on a square (server) will cause the remainder of the interface to update its data specific to the selected server. In the heat map, as will be described in greater detail below, a red square represents anomalous behavior for the server represented by the square. Similarly, an email alert may be sent including actual and threshold values, server identification information, alert type information, and alert date and time information.

FIG. 7B is a screen shot of a Key Metrics widget, according to an example embodiment of the present invention, with a plurality of spark lines providing a quick reference line graph of each performance counter's value over time. As illustrated in FIG. B, the bounding box 715 of the spark line is the calculated normal behavior range. FIG. 7B illustrates seven related performance counters and a health score. The health score box indicates the value from the data model output; it is possible for this value to indicate a threshold breach (e.g., turns red) while the seven performance counters do not (e.g., remain green).

Figure 7C:
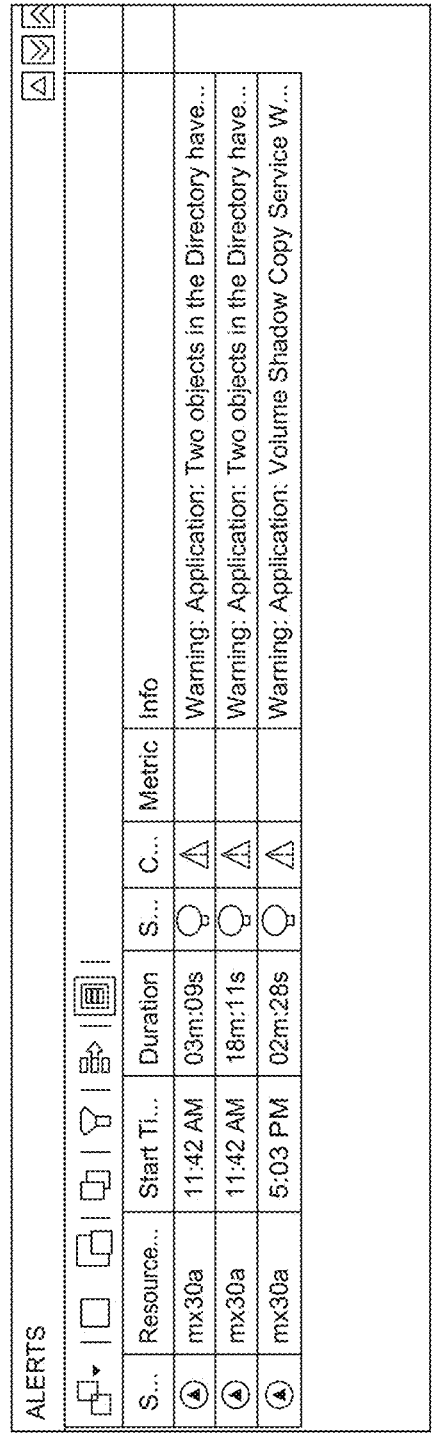

FIG. 7C is a screen shot of an Alerts widget, according to an example embodiment of the present invention, permitting a user to review alerts. In other words, the Alerts widget enables users to view events that took place in the system and were the basis for alerts issued as a result of the predictive behavioral analysis. Therefore, the user need not log into individual servers to view their logs.

Figure 7D:
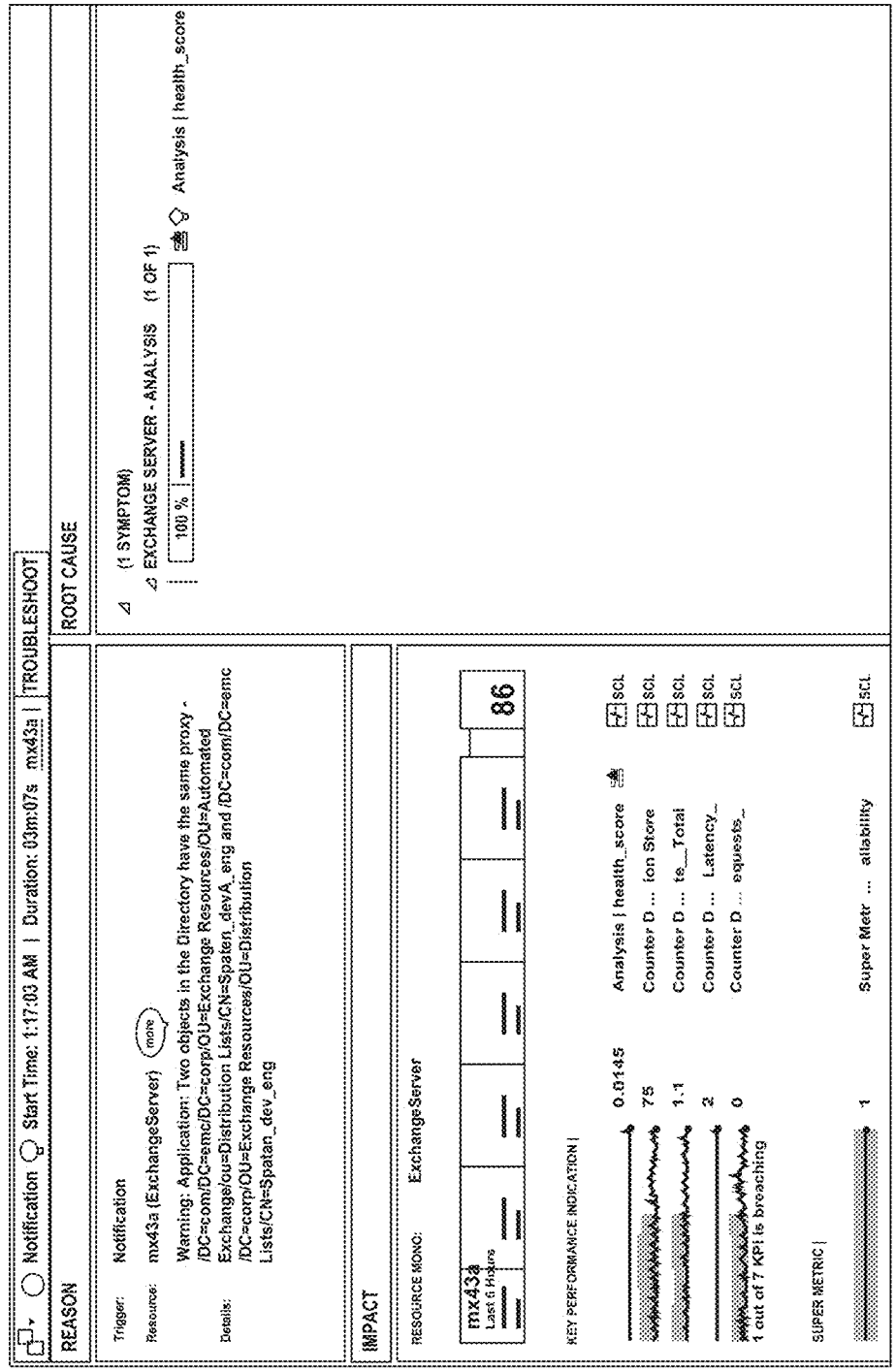

FIG. 7D is a screen shot of additional information, according to an example embodiment of the present invention, provided within a selected alert, such as alert reason information (e.g., trigger, resource, details), alert impact information (e.g., resource kind, key performance indicators), and alert root cause (e.g., symptoms). For example, the information shown in FIG. 7D may be provided by selecting an alert, such as by double-clicking, thereby allowing the user to obtain additional information regarding the alert.

Figure 7E:
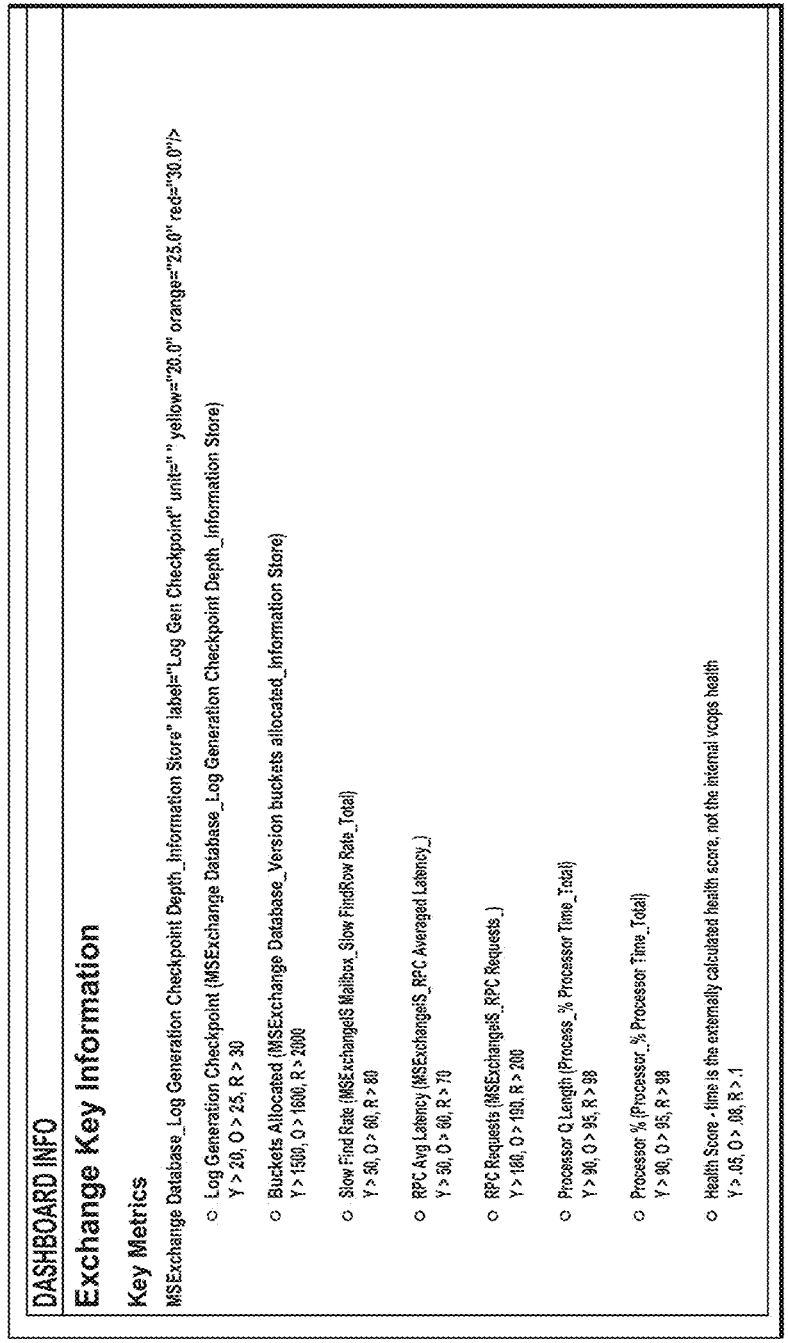
Figure 7F:
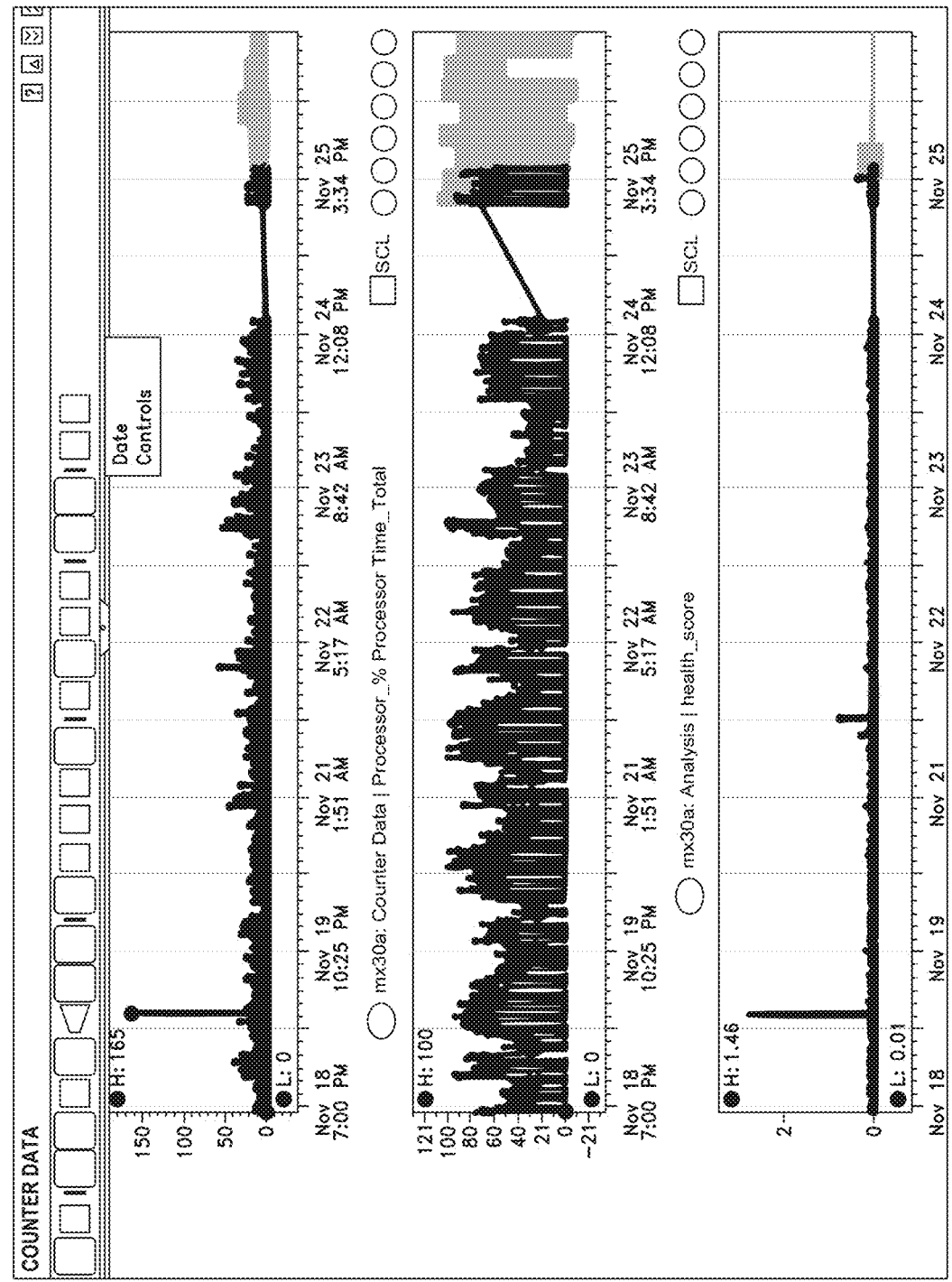

FIG. 7E is a screenshot of a Dashboard Info widget, according to an example embodiment of the present invention, that shows key metric and threshold information. As illustrated in FIG. 7E, various thresholds may be defined for individual performance counters and provide an informational alert indicating the existing performance counter settings.

FIG. 7F is a screenshot of a Performance Counter Data widget, according to an example embodiment of the present invention, enabling a user to evaluate the behavior of a performance counter within a specific period of time. As illustrated in FIG. 7F, a learned behavior range bounds the signal; values outside this range are considered abnormal behavior. This widget allows the user to view behavior of key performance indicators in a specified date range and provides the ability to obtain a more granular view of the performance counter data.

Figure 7G:
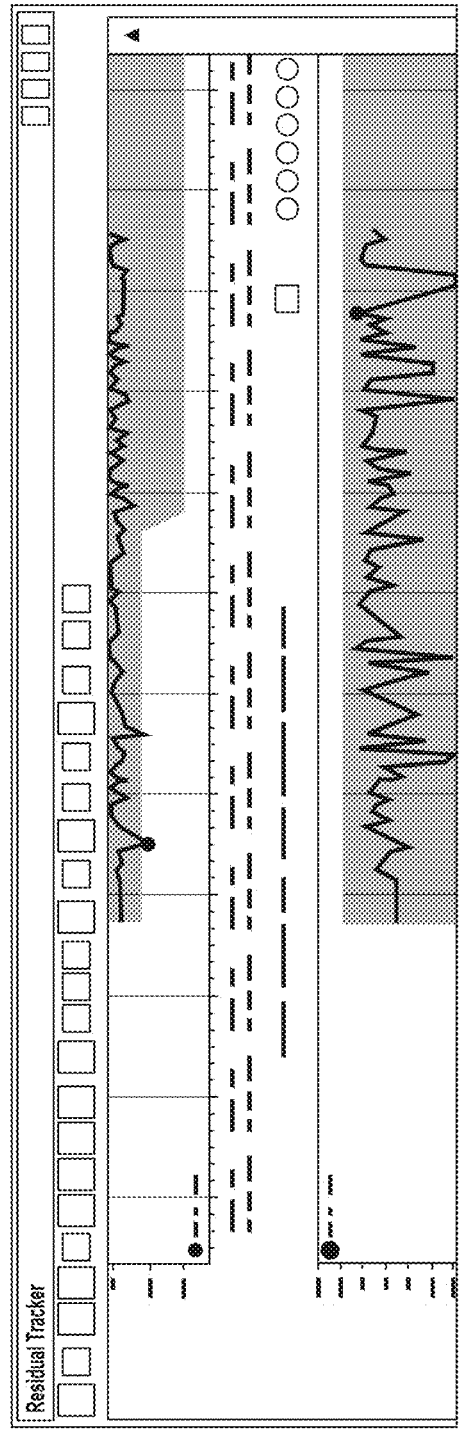

FIG. 7G is a screenshot of a Residual Tracker widget, according to an example embodiment of the present invention, enabling a user to evaluate the behavior of the residual for a performance counter. This widget allows the user to view behavior of residual values in a specified date range and provides the ability to obtain a more granular view of the residual values.

Figure 8:
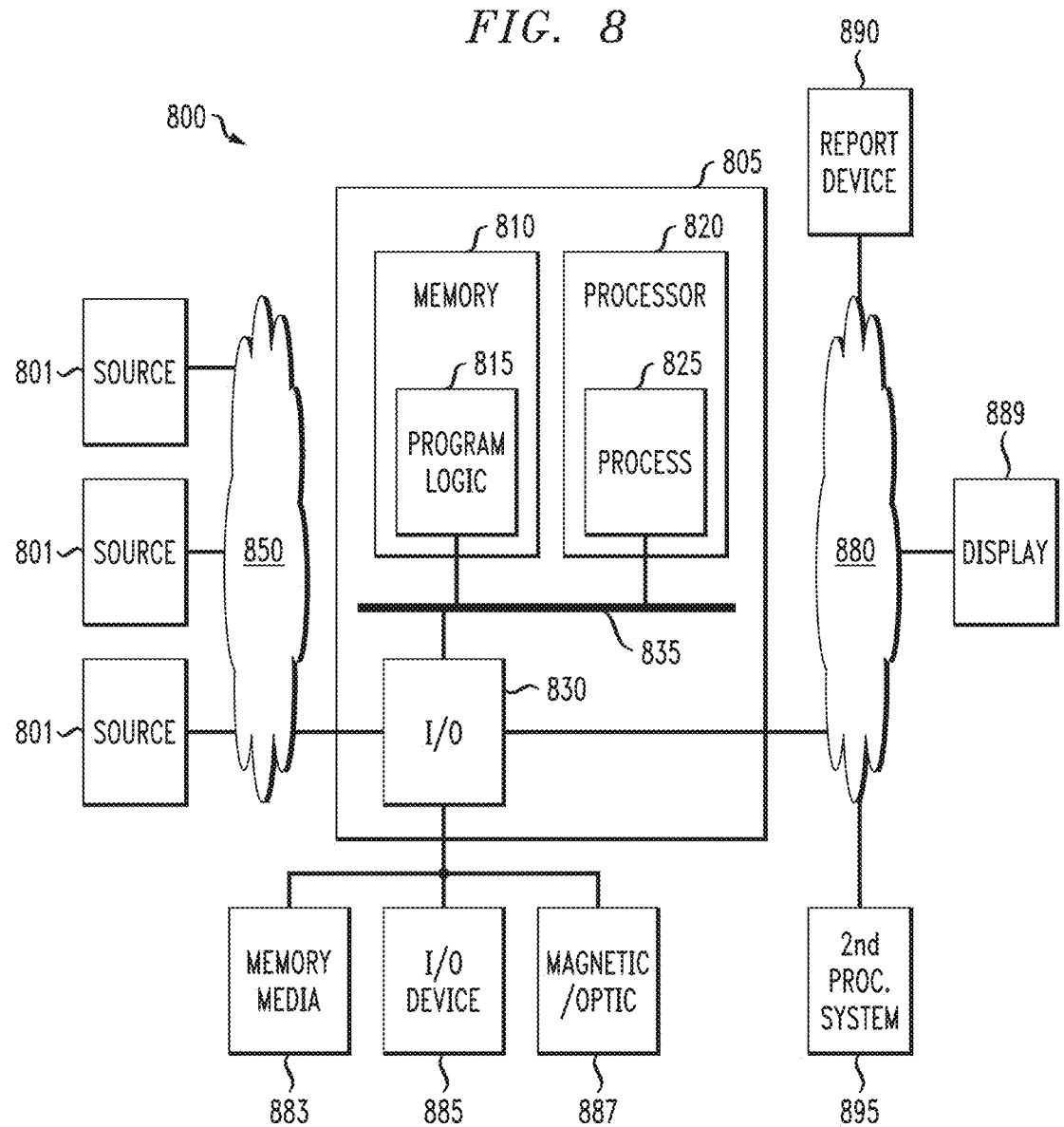
FIG. 8 is a block diagram of an apparatus according to an example embodiment of the present invention.

FIG. 8 is a block diagram of an example embodiment apparatus 805 according to the present invention. The apparatus 805 may be part of a system 800 and includes memory 810 storing program logic 815, a processor 820 for executing a process 825, and a communications I/O interface 830, connected via a bus 835.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 9:
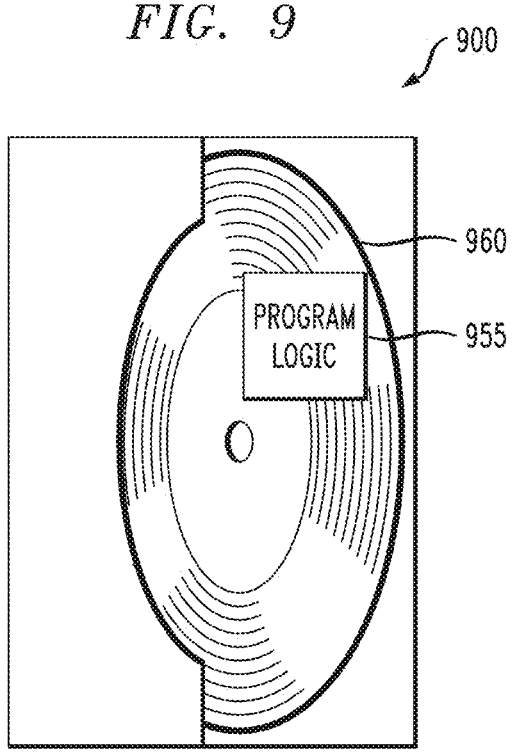
FIG. 9 is a block diagram of an example embodiment of the present invention embodied in computer program code.

FIG. 9 is a block diagram of a computer program product 900 including program logic 955, encoded on a computer-readable medium 960 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
    collecting performance data from a plurality of data sources in a network, the performance data being associated with a plurality of servers in an information technology (IT) infrastructure;
    performing predictive behavioral analytics regarding IT operations on the collected performance data;
    determining health scores of the servers in the IT infrastructure, wherein the health score of a given one of the servers in the IT infrastructure is determined by:
        identifying a set of key performance indicators for the given server;
        determining forecast values for the key performance indicators using the predictive behavioral analytics;
        calculating differences between actual values for the key performance indicators and the forecast values of the key performance indicators; and
        generating a health score for the given server as a combination of the calculated differences for the key performance indicators using a kernel distribution function, wherein the kernel distribution function is configured to identify correlations between at least two of the set of key performance indicators to determine whether anomalous values for the at least two key performance indicators are correlated; and
    reporting on results of the predictive behavioral analytics, wherein reporting on results of the predictive behavioral analytics comprises providing a graphical user interface comprising a plurality of user interface elements configured:
        to generate one or more visualizations representing the health scores of the servers in the IT infrastructure;
        to provide one or more alerts relating to specified ones of the servers in the IT infrastructure; and
        to initiate remedial action to address the one or more alerts by altering a configuration of one or more of the servers in the IT infrastructure;
    wherein the plurality of user interface elements comprises:
        a first user interface element providing a heat map visualization of the servers in the IT infrastructure and one or more user interface features for selecting one or more areas of the heat map visualization, the heat map visualization being configured to highlight a given area responsive to detecting one or more alerts based on the predictive behavioral analytics for one or more servers associated with the given area; and
        at least a second user interface element configured to generate one or more additional visualizations responsive to selecting at least one area of the heat map visualization, the one or more additional visualizations presenting additional information for one or more servers associated with the selected area of the heat map visualization;
    wherein the method is performed using at least one processing device comprising a processor coupled to a memory.

2. The method of claim 1 wherein collecting performance data from a plurality of data sources in a network comprises:
    collecting performance counter data for a plurality of key performance indicators in the network; and
    collecting log data comprising a plurality of events each having an event identifier (ID) and an event level.

3. The method of claim 2 wherein performing predictive behavioral analytics regarding IT operations on the collected performance data comprises, for log data, estimating a distribution function for each event ID and event level in the log data.

4. The method of claim 3 further comprising:
    for events of a first type occurring with a first frequency according to the distribution function, generating an alert; and for events of second type occurring with a second frequency according to the distribution function, at a first time, determining a number of expected occurrences of each event ID and, at a second time, identifying anomalous events from the log data according to the distribution function, the anomalous events comprising events for a given event ID exceeding the number of expected occurrences of the given event ID.

5. The method of claim 4 wherein identifying anomalous events from the log data according to the distribution function comprises:
   setting a probability threshold for each event ID according to the distribution function; and
   identifying events outside of the probability threshold.

6. The method of claim 2 wherein performing predictive behavioral analytics regarding IT operations on the collected performance data comprises, for performance counter data:
   querying a statistical model to determine whether performance counter data for each respective key performance indicator in the network is indicative of an anomalous value;
   combining the query results for each respective performance counter; and
   generating an alert for the combined query results.

7. The method of claim 6 wherein querying a statistical model to determine whether performance counter data for each respective key performance indicator in the network is indicative of an anomalous value comprises:
   modeling performance counter data for each respective key performance indicator;
   calculating a residual value for each respective key performance indicator; and
   querying the statistical model to determine whether the calculated residual value is an anomalous value.

8. The method of claim 7 wherein modeling performance counter data for each respective key performance indicator comprises tracking trend, bias, and seasonality components of a statistical signal embodying the performance counter data.

9. The method of claim 7 wherein calculating a residual value for each respective key performance indicator comprises:
   determining an actual performance counter value;
   determining a forecast performance counter value according to its respective model; and
   calculating the residual value as a difference between the forecast performance counter value and the actual performance counter value.

10. The method of claim 9 wherein generating an alert for the combined query results comprises:
    combining the residual values for each respective key performance indicator;
    identifying a correlation between a plurality of anomalous values; and
    reporting on the correlated variables according to the residual values.

11. The method of claim 1 wherein the one or more additional visualizations generated by the second user interface element comprise one or more event visualizations of alerts for the servers associated with the selected area of the heat map visualization, a given one of the alert visualizations comprising an indication of one or more events causing a given alert as determined by the predictive behavioral analytics.

12. The method of claim 11 wherein the plurality of user interface elements further comprises a third user interface element configured to generate one or more additional alert visualizations responsive to selecting at least one of the event visualizations generated by the second user interface element, the additional alert visualization for the given alert comprising alert reason information, alert impact information, and alert root cause information.

13. The method of claim 1 wherein the one or more additional visualizations generated by the second user interface element comprise one or more spark line visualizations representing values of performance counters for performance metrics of the servers associated with the selected area of the heat map visualization, at least a given one of the spark line visualizations comprises a bounding box representing expected behavior of its corresponding performance counter determined based on the predictive behavioral analytics.

14. The method of claim 13 wherein the plurality of user interface elements further comprises a third user interface element providing performance counter visualizations, the performance counter visualizations comprising at least one of:
    one or more visualizations of current performance counter settings and one or more user interface features for adjusting the performance counter settings;
    one or more visualizations of behavior of one or more selected performance counters for a specified period of time; and
    one or more visualizations of behavior of a residual value associated with a given one of the performance counters, the residual value for the given performance counter representing a difference between a forecast performance counter value determined based on the predictive behavioral analytics and an actual value of the given performance counter.

15. An apparatus comprising:
    one or more processors; and
    memory storing computer program code that, when executed on the one or more processors, causes the apparatus to perform predictive behavioral analytics, comprising:
    collecting performance data from a plurality of data sources in a network, the performance data being associated with a plurality of servers in an information technology (IT) infrastructure;
    performing predictive behavioral analytics regarding IT operations on the collected performance data;
    determining health scores of the servers in the IT infrastructure, wherein the health score of a given one of the servers in the IT infrastructure is determined by:
        identifying a set of key performance indicators for the given server;
        determining forecast values for the key performance indicators using the predictive behavioral analytics;
        calculating differences between actual values for the key performance indicators and the forecast values of the key performance indicators; and
        generating a health score for the given server as a combination of the calculated differences for the key performance indicators using a kernel distribution function, wherein the kernel distribution function is configured to identify correlations between at least two of the set of key performance indicators to determine whether anomalous values for the at least two key performance indicators are correlated; and
    reporting on results of the predictive behavioral analytics, wherein reporting on results of the predictive behavioral analytics comprises providing a graphical user interface comprising a plurality of user interface elements configured:
  to generate one or more visualizations relating to usage of the servers in the IT infrastructure;
  to provide one or more alerts relating to specified ones of the servers in the IT infrastructure; and
  to initiate remedial action to address the one or more alerts by altering a configuration of one or more of the servers in the IT infrastructure;
wherein the plurality of user interface elements comprises:
  a first user interface element providing a heat map visualization of the servers in the IT infrastructure and one or more user interface features for selecting one or more areas of the heat map visualization, the heat map visualization being configured to highlight a given area responsive to detecting one or more alerts based on the predictive behavioral analytics for one or more servers associated with the given area; and
  at least a second user interface element configured to generate one or more additional visualizations responsive to selecting at least one area of the heat map visualization, the one or more additional visualizations presenting additional information for one or more servers associated with the selected area of the heat map visualization.

16. The apparatus of claim 15 wherein collecting performance data from a plurality of data sources in a network comprises:
  collecting performance counter data for a plurality of key performance indicators in the network; and
  collecting log data comprising a plurality of events each having an event identifier (ID) and an event level.

17. The apparatus of claim 16 wherein performing predictive behavioral analytics regarding IT operations on the collected performance data comprises, for log data, estimating a distribution function for each event ID and event level in the log data.

18. The apparatus of claim 17 further comprising:
  for events of a first type occurring with a first frequency according to the distribution function, generating an alert; and
  for events of second type occurring with a second frequency according to the distribution function, at a first time, determining a number of expected occurrences of each event ID and, at a second time, identifying anomalous events from the log data according to the distribution function, the anomalous events comprising events for a given event ID exceeding the number of expected occurrences of the given event ID.

19. The apparatus of claim 18 wherein identifying anomalous events from the log data according to the distribution function comprises:
  setting a probability threshold for each event ID according to the distribution function; and
  identifying events outside of the probability threshold.

20. The apparatus of claim 16 wherein performing predictive behavioral analytics regarding IT operations on the collected performance data comprises, for performance counter data:
  querying a statistical model to determine whether performance counter data for each respective key performance indicator in the network is indicative of an anomalous value;
  combining the query results for each respective performance counter; and
  generating an alert for the combined query results.

21. The apparatus of claim 20 wherein querying a statistical model to determine whether performance counter data for each respective key performance indicator in the network is indicative of an anomalous value comprises:
  modeling performance counter data for each respective key performance indicator;
  calculating a residual value for each respective key performance indicator; and
  querying the statistical model to determine whether the calculated residual value is an anomalous value.

22. The apparatus of claim 21 wherein modeling performance counter data for each respective key performance indicator comprises tracking trend, bias, and seasonality components of a statistical signal embodying the performance counter data.

23. The apparatus of claim 21 wherein calculating a residual value for each respective key performance indicator comprises:
  determining an actual performance counter value;
  determining a forecast performance counter value according to its respective model; and
  calculating the residual value as a difference between the forecast performance counter value and the actual performance counter value.

24. The apparatus of claim 23 wherein generating an alert for the combined query results comprises:
  combining the residual values for each respective key performance indicator;
  identifying a correlation between a plurality of anomalous values; and
  reporting on the correlated variables according to the residual values.

25. A non-transitory computer readable medium having computer program code encoded thereon that when executed on a processor of a computer causes the computer to perform predictive behavioral analysis, the computer program code comprising:
  computer program code for collecting performance data from a plurality of data sources in a network, the performance data being associated with a plurality of servers in an information technology (IT) infrastructure;
  computer program code for performing predictive behavioral analytics regarding IT operations on the collected performance data;
  computer program code for determining health scores of the servers in the IT infrastructure, wherein the health score of a given one of the servers in the IT infrastructure is determined by:
    identifying a set of key performance indicators for the given server;
    determining forecast values for the key performance indicators using the predictive behavioral analytics;
    calculating differences between actual values for the key performance indicators and the forecast values of the key performance indicators; and
    generating a health score for the given server as a combination of the calculated differences for the key performance indicators using a kernel distribution function, wherein the kernel distribution function is configured to identify correlations between at least two of the set of key performance indicators to determine whether anomalous values for the at least two key performance indicators are correlated;

computer program code for reporting on results of the predictive behavioral analytics, wherein reporting on results of the predictive behavioral analytics comprises providing a graphical user interface comprising a plurality of user interface elements configured:
   to generate one or more visualizations representing the health scores of the servers in the IT infrastructure;
   to provide one or more alerts relating to specified ones of the servers in the IT infrastructure; and
   to initiate remedial action to address the one or more alerts by altering a configuration of one or more of the servers in the IT infrastructure;
wherein the plurality of user interface elements comprises:
   a first user interface element providing a heat map visualization of the servers in the IT infrastructure and one or more user interface features for selecting one or more areas of the heat map visualization, the heat map visualization being configured to highlight a given area responsive to detecting one or more alerts based on the predictive behavioral analytics for one or more servers associated with the given area; and
   at least a second user interface element configured to generate one or more additional visualizations responsive to selecting at least one area of the heat map visualization, the one or more additional visualizations presenting additional information for one or more servers associated with the selected area of the heat map visualization.

* * * * *